(12) United States Patent
Brouwer

(10) Patent No.: US 8,306,905 B2
(45) Date of Patent: *Nov. 6, 2012

(54) SYSTEM AND METHOD OF IMPLEMENTING MASSIVE EARLY TERMINATIONS OF LONG TERM FINANCIAL CONTRACTS

(75) Inventor: Derk Pieter Brouwer, Amsterdam (NL)

(73) Assignee: TriOptima AB (SE)

( * ) Notice: Subject to any disclaimer, the term of this patent is extended or adjusted under 35 U.S.C. 154(b) by 0 days.

This patent is subject to a terminal disclaimer.

(21) Appl. No.: 13/184,829

(22) Filed: Jul. 18, 2011

(65) Prior Publication Data

US 2011/0276461 A1 Nov. 10, 2011

Related U.S. Application Data

(60) Division of application No. 12/584,973, filed on Sep. 15, 2009, now Pat. No. 8,010,441, which is a continuation of application No. 10/154,689, filed on May 24, 2002, now Pat. No. 7,613,649, which is a continuation-in-part of application No. PCT/NL00/00856, filed on Nov. 23, 2000.

(30) Foreign Application Priority Data

Nov. 24, 1999 (NL) ...................................... 1013662

(51) Int. Cl.
*G06Q 40/00* (2012.01)
(52) U.S. Cl. ................................. 705/37; 705/35; 705/38
(58) Field of Classification Search .................... 705/35, 705/37, 38
See application file for complete search history.

(56) References Cited

U.S. PATENT DOCUMENTS

| 5,774,553 | A | 6/1998 | Rosen |
|---|---|---|---|
| 5,802,499 | A | 9/1998 | Sampson et al. |
| 5,978,485 | A | 11/1999 | Rosen |
| 6,304,858 | B1 | 10/2001 | Mosler et al. |
| 7,206,768 | B1 | 4/2007 | deGroeve et al. |
| 7,266,521 | B1 | 9/2007 | Handa et al. |
| 2001/0049649 | A1 | 12/2001 | Baecker et al. |
| 2002/0010670 | A1 | 1/2002 | Mosler et al. |

FOREIGN PATENT DOCUMENTS
WO 99/41687 A2 8/1999

OTHER PUBLICATIONS

Don Chance, "An Introduction to Derivatives," 1998, The Dryden Press, Forth Worth, pp. 139-147.
Thomas Eggenschwiler and Erich Gamma, "ET++SwapsManager: Using Object Technology in the Financial Engineering Domain," ACM Sigplan Notices, US Association for Computing Machinery, Oct. 1992, vol. 27, No. 10, pp. 166-177.
Loretta DeSourdy, "New Legislation on Netting and Payments Finality," Jun. 1999, Reserve Bank of New Zealand: Bulletin vol. 62, No. 2, pp. 61-65.

*Primary Examiner* — Kenneth Bartley
(74) *Attorney, Agent, or Firm* — Lerner, David, Littenberg, Krumholz & Mentlik, LLP

(57) ABSTRACT

A method of and system for terminating or assigning outstanding OTC derivative transactions between a plurality of financial institutions (banks). The system comprises: a processing station arranged to receive transaction data describing a plurality of transactions from a plurality of banks via the Internet. The processing station comprises: a linking module for linking different versions of the same transaction received from different parties to that transaction; an analysis module for determining a set of linked transactions between a plurality of different banks, wherein each bank has debts and claims towards other banks in the set; a calculation module arranged to calculate an aggregated value of each set of linked transactions and select the set of linked transactions which has an aggregated value within bank-specified tolerance limits acceptable for executing a termination; and an execution module for executing a termination or assignment of the selected set of linked transactions.

21 Claims, 12 Drawing Sheets

SYSTEM AND METHOD OF IMPLEMENTING MASSIVE EARLY TERMINATIONS OF LONG TERM FINANCIAL CONTRACTS

CROSS-REFERENCE TO RELATED APPLICATIONS

This application is a divisional of U.S. application Ser. No. 12/584,973 filed Sep. 15, 2009, which is a continuation of U.S. application Ser. No. 10/154,689 filed May 24, 2002, which is a continuation in part of International Application No. PCT/NL00/00856, filed on Nov. 23, 2000 and published in English under International Publication No. WO 01/39060 on May 31, 2001, the entire disclosures of which are incorporated herein by reference. This application claims the priority of Netherlands Patent Application No. 1013662 filed Nov. 24, 1999, the entire disclosure of which also is incorporated herein by reference.

FIELD OF THE INVENTION

The present invention concerns a system and method of implementing massive early terminations of long-term financial contracts, such as OTC (Over the Counter) derivative contracts. More particularly, the present invention relates to a system for a network based, automated process to decrease the number of outstanding financial derivative transactions between counterparties with the aim of lowering the gross and net credit exposures between counterparties and/or to enhance risk-control and/or lower operational costs and/or risks for each counterparty.

BACKGROUND OF THE INVENTION

Financial derivatives are contracts of which the price/value of the contract varies with the value of an underlying instrument. The underlying instrument may be a bond, an equity, an interest rate, a currency exchange rate, commodity price or, in a recent development, even a credit risk.

Financial derivatives can either be standardised contracts traded on a recognised Exchange or OTC traded (see below). In the first case, one of the counterparties in a trade is an Exchange. As the contracts are standardised there is no difference between the net and gross outstanding volume for each market participant. Buying on day 1 and selling on day 2 leads to a total disengagement of the position. Futures and exchange-traded options are common instruments in this class.

As the prices of these instruments are objectively known at any point in time they can fulfill the function of "benchmark instruments" for the calibration of other prices. This "benchmark" function can as well be fulfilled by some liquid underlying instruments, like government bonds, stocks of companies with a sufficient high market capitalisation or frequently traded currency-pairs.

The other possibility is that the contracts are individually negotiated and tailor-made between two counterparties (so called "over the counter (OTC) transactions"). In this case entering into a contract on day 1 and entering into a similar contract with the opposite sign on day 2 may lead to a market risk position of close to zero, but still to 2 contracts which have to be maintained until their designated final maturity. Instruments in this class are swaps, swaptions, FRAs, caps, floors, FX-forwards, all kind of options on stocks, bonds, interest rates or currencies, as well as more exotic varieties and credit derivatives. Since the OTC contracts are individually negotiated, no objective market price exists. The parties need to do their own valuation of the contracts both when dealing as well as later on when establishing the market value of their contracts during their life. This valuation is normally based on pricing formulas using so-called valuation parameters for input. There are different models that can be used, depending on the preferences of a party. The valuation parameters are either estimated or derived from benchmark instruments using other theoretical models. This subjective method of establishing the value of a contract means that the parties do get to different results. The differences are small in simple products but can be quite substantial in more complex products.

Active players in these instruments may run books that comprised of tens of thousands of individual transactions (the largest dealers even have more than 200,000 outstanding contracts). The management of these positions is no longer possible on the level of the individual transactions, but only on an aggregated level. A common way of risk management is to sort the OTC-instruments by underlying instrument, and then express the market value and some risk-characteristics in time-buckets.

Frequently used risk-characteristics or sensitivities to the valuation parameters are for example the so-called Greeks: delta, gamma, vega and theta. Delta refers to the first differential from the value of the trade for a change in value of the underlying instrument, thus enabling the judging of the risk-content of the position expressed in units of the underlying instrument. Gamma refers to the second differential from the value of the trade for a change in value of the underlying instrument, or the change in delta for each subsequent change in the value of the underlying instrument. Gamma can be extremely non-linear, even for individual trades, and certainly for portfolios of many trades. Vega is the change in value of the instrument for a small change in the volatility of the instrument. Theta is the change in value of the instrument from one day to the next, all other parameters held constant. In case the contracts have a foreign currency component, the net present value of the foreign currency amount is sensitive to changes in the FX-rates. Hence, these net present values should also be considered a risk-characteristic. For derivatives where the main underlying is the interest rate for various time periods, (the so-called yield curve), the deltas are normally calculated referring to changes in interest rates in different time segments (or time buckets) of the yield curve.

Where the present application later on refers to the Greeks, all sensitivities to the valuation parameters should be included. The Greeks from individual trades can be aggregated for a portfolio of trades to form the corresponding Greeks of the portfolio. A set of trades is defined as being risk-neutral when the aggregated Greeks are close to zero. Hence, the aggregated value of a risk-neutral set of trades is quite insensitive to changes in the valuation parameters The institutions active in the OTC markets use computer systems for storing the details of the transactions they have done. These systems normally have the capability to revalue all transactions and calculate the Greeks of all transactions on a unilateral basis. A normal procedure is also to do a daily mark-to-market, which means re-valuation of all transactions according to the prevailing market conditions. The mark-to-market values as of close of business are stored in databases for calculating profit and loss, risk exposure, credit exposure etc. The Greeks or the risk parameters can be calculated in different ways using different units or different scaling factors. Semantically, the risk parameters contain the same information although the numerical values may differ, depending on the methodology used by the risk-management system.

The professionally dealing participants in the OTC markets are banks, investment banks and other financial institutions (later referred to as dealers or market-makers). ISDA, the International Swap and Derivatives Association, has roughly 180 primary members and is a trade organisation for all organisations in some way active in the OTC derivatives market. A substantial number of these dealers consider themselves to be "market-makers" in a more or less broad spectrum of products. This means that they are always willing to put a price on a potential transaction that is brought to their attention by a customer or another dealer, be it direct or through a broker. In roughly 80% of the transactions both participants are dealers/market-makers. Only 20% of the transactions have an "end-user" as party to the agreement. The role of the market maker is to provide liquidity to the market. The motivation for the market maker is to deal OTC derivatives in high volumes, both "buying" and "selling", making revenues out of the bid/offer spread.

The total outstanding volume of interest rate based OTC derivatives has passed the 60 TRILLION US$, the OTC market as a whole has a size of over 88 TRILLION US$ according to statistics as of December 1999 collected by the Bank for International Settlements.

The motivation for entering into an OTC derivative transaction is the management of market risk positions, either for the purpose of hedging (immunising a position from changes in market prices) or for the purpose of deliberate position taking (trying to make a profit from an expected change in market prices).

The advantage of derivatives is that the market risk of substantial amounts can change hands without the need to really transfer the underlying (nominal) values.

OTC derivative contracts can have maturities up to 30 or even 50 years but the majority of contracts traded are in the up to 10 years maturity range. The long maturity means that financial institutions (banks) active in this market build up large sets of live transactions. Holding these live transactions is associated with operational cost and operational risk.

The economic value of an individual contract can be several million dollars. An individual contract can also have a significant market risk meaning that the value can change several hundred thousand dollars during the course of a normal business day. Banks need to manage the aggregated market risk so that they don't accidentally run into trading losses.

Since banks are both buying and selling these types of contracts, the aggregated value and market risk of all transactions done by a bank are typically just a fraction of the gross value and market risk of the transactions. (With gross value it is meant the sum of the absolute values of the individual contracts). Still, in each bilateral relationship a bank will have either a net claim or a net debt. A claim is a credit exposure and as such is subject to capital sufficiency requirements imposed by the regulators. Hence, OTC derivatives trading also generates credit risk and capital costs.

PROBLEMS RELATED TO THE STATE OF THE ART

As explained above, the purpose of entering into an OTC transaction is the transfer of market risk, either to increase or decrease the total exposure to certain market parameters, depending on the preferences of the counterparties. As an unavoidable consequence however, the parties are getting a new exposure to two different risk categories, credit risk and operational risk.

As the market moves, the net present value of an transaction will move away from the roughly zero level at which the transaction was concluded. This means, one party gets a claim on the other party, the validity of the transfer of market risk is therefor always dependent on the ability of the parties to fulfill their obligations under the contract. It is of little use to have had the correct market view and get a claim of X on a counterparty that has gone bankrupt in the meantime. Therefore, an important factor in the development of the OTC markets has been the management of credit risk.

Originally, dealers calculated this credit risk as a percentage on each transaction (depending on the type of transaction and the maturity) and charged the so-calculated amounts against the credit risk limit their institutions were willing to expose themselves to each counterparty. Bank supervisors force banks to hold capital against both market risk as well as credit risk. Therefore each transaction or a certain sub-set of transactions, for example all transactions with counterparty X, will be internally charged with the cost of capital tied up in the transaction.

The total capital of the bank is a limited and scarce resource that effectively puts a limit on the volume of banking activities. It is therefore desirable for a bank to try to reduce the capital tied up by the unintentionally acquired credit risk in OTC derivatives.

As the market grew rapidly, it was soon discovered that the sum of all transactions between two counterparties was much less dependent on market changes than the sum of the individual transactions. Many active market participants are dealing back and forth with each other in both directions, sometimes even on a daily basis. This reduces the sensitivity of the portfolio: "all transactions with counterparty X" for changes in market values. For this reason more sophisticated institutions are now calculating the credit exposure based on the sum of all transactions with each counterparty.

This development has been made possible by the fact that ISDA developed the so-called "Master Agreement", whereby all individual trades are deemed to be one Agreement, and many countries around the world changed their bankruptcy laws to accommodate this development (the so called "netting" process). The European Banking Federation has recently as well developed a Master-Agreement. The bilateral netting will, for the banks that are using this method, reduce the credit exposure. Still, many banks are not using netting, thus calculating exposures on a gross basis, or with a combination, i.e. they use netting in combination with a limited "add-on" for each individual trade.

The credit exposure can for obvious reasons never be netted between counterparties. A claim on party X can not be offset by a debt to party Y. The asymmetric nature of credit exposure means that the total exposure of a bank normally grows with the number of counterparties it is dealing with. The problem is aggravated if the exposures are calculated on a gross basis, since then the exposure even grows with the number of transactions.

In another attempt to prevent the exposure from growing outside the available limits of a bank, especially in the longer time buckets, which are the most risky and therefor the most scarce, counterparties agree on so-called "break-clauses". This allows one or both parties to terminate the transaction at specified points in time at the prevailing market price.

A party may also choose to assign his part of a deal to a new party. In such an assignment, a deal between two parties A and B, where A assigns his part of the deal to a third party C, C will step in as the new counterparty towards B. By an assignment, both A, B and C can get reduced or increased exposure towards the other parties. The assignment requires the consent of both party B and C.

Even then a substantial number of potential trades could not be done, because counterparties were no longer willing to accept each other. Hence, the concept of "credit-mitigation" has been invented. In this process, when the net present value of all transactions exceeds a certain, bilateral set limit, their parties deliver securities or cash to each other, as a guaranty for their obligations under the contract. This process is called "collateralisation". It does in no way eliminate or reduce the underlying reason for the unwanted credit exposure, it only mitigates the effect of the exposure. To establish the value of cash or securities one party has to transfer to the other party, parties have to agree on the value of the derivative contracts. This can either be done in a multiple of bilateral relationships, or through a central service. Cedel Bank in Luxembourg has provided this service. (See International patent application WO 97/03409, SAMPSON, "Method and system for providing credit support . . . "). For several reasons, this service was not accepted by the marketplace and is for the moment discontinued. Whichever method is chosen, the collateralisation process incurs a lot of operational costs and operational risk, since the value of the credit exposure (the sum of the outstanding derivative contracts) and/or the value of the collateral may change in such a way that it no longer covers the credit exposure.

Another way of addressing the costs of OTC derivatives dealing is clearing. One example of this is a service called SwapClear provided by the London Clearing House. Counterparties that are members of a clearinghouse may choose to have the clearinghouse stepping in as the counterpart on both sides of the transaction. By doing this for several deals and counterparties, a clearing member can aggregate a lot of OTC derivative deals to the same counterpart and hence get an improved credit exposure netting effect. The clearinghouse is also calculating a settlement value on the cleared transactions in order to keep track of the net exposure towards their members. Any residual debt or claim is settled daily in cash on a margin account. Some clearinghouses have lately become exempt from capital charges according to the capital adequacy legislation in many countries. This means that the capital costs for cleared deals effectively become close to zero. Some clearinghouses also provide other administrative services where some of the operational costs and risks are reduced. The clearinghouses however do not clear all transactions under a master agreement. Hence, the netting arrangement under the master agreement is broken in two parts, one part that moves to the Clearing House, and another part that stays under the master agreement. This means that there will be a substantial, possibly even a higher, residual credit exposure under the master agreement.

Far from all OTC derivative market participants are members of a clearing house and it is only when both parties are members of the same clearinghouse that a deal can be cleared. When a clearinghouse steps in as the counterpart on both sides of the transaction, the number of outstanding deals is doubled. Even for cleared deals, there are substantial operational costs and risks associated with the number of outstanding deals, both within the clearing house as for its members. They still have to perform reconciliation of the tasks performed by the clearing house as well as other administrative tasks linked to the number of outstanding transactions and risk management It is fair to say that both collateralisation and clearing are curing the symptoms of the problems and not the cause. The cause of the problems, be it unwanted credit risk or operational costs and risks, is the high number of outstanding bilateral contracts in such a size that the market risk of the sum of these contracts in many bilateral relationships is close to zero. However, so far there has been no efficient mechanism to make parties agree on the early termination of these unnecessary transactions.

If the aggregated Greeks of all transactions done between two counterparties are high, the credit exposure will vary a lot as the market is changing. This sensitivity to the market movements will cause problems in the sense that credit limits or collateral thresholds may involuntarily be exceeded and that collateral obligations may vary causing a lot of collateral transactions or large movements in the margin account at the clearing house. For this reason, it is desirable for the counterparties to reduce the aggregated Greeks in their bilateral transactions.

Operational risk can be defined as all risks an institution is exposed to, other than the intentionally accepted market and credit risk within the allowed limits of the bank. This includes, among others, unwanted market or credit risk as a consequence of staff errors (on purpose or by accident) or errors in the risk management systems, fraud by staff, customers or third parties, wrong valuation of transactions based on wrong parameter input, or mistakes in the maintenance of outstanding contracts during their lifetime (so-called fixings, settlements, assignments, exercises or payments).

Although the majority of transactions has a lifetime of up to 5 years, transactions of 30, 40 or even 50 years do occur as well. A trader or risk manager, who for some reason is using the wrong valuation parameters, may build up substantial losses over a long period of time. Smaller banks and certainly many end-users are lacking the possibility to do an independent mark-to-market of their outstanding contracts.

Many high profile mishaps have been published over the years, (even to the extent that some commentators were seeing all derivatives as "evil" instruments) and this should be considered only as the tip of the iceberg; only the low frequency/high impact accidents are getting publicity. The high-frequency/low-impact accidents, of which the total amount of damage may well exceed that of their published cousins, are frequently overlooked. Forced by these developments, as well as higher legal standards, market participants have invested a lot of effort, staff and systems to prevent accidents from happening. Procedures have been sharpened, internal regulations improved and rigid control measures established. The overhead cost of dealing has for this reason increased dramatically, and still accidents do happen from time to time.

The operational risk is a concern for the supervisors of the financial markets. There are proposals for introducing capital charges to cover operational risk. So far, the supervisors have not been able to work out principles or a model for how these capital charges will be calculated. The issue is still on the agenda though, and it is likely that any such model will generate capital costs that grow with the number of outstanding deals.

In addition to these new types of risks, the acquired market risk may well be according to the trader's intention. Still bank supervisors force the banks to hold capital against market risks as well. An individual transaction's contribution to the total market risk, for which capital must be held, can be quite complicated to calculate, especially when the banks are using so called proprietary models for these calculations. However, one method, accepted by the bank supervisors and used by many banks, is based on transforming all off-balance sheet items, e.g. OTC derivatives, into roughly equivalent on-balance sheet items to calculate the capital cost. In this case, it is possible to assign a capital cost to each individual transaction.

In summary, there is therefore an incentive for banks to try to reduce the costs and risks associated with the OTC derivatives portfolios they have build up. An apparent way of achieving this would be to terminate OTC transactions before their designated maturity, preferably in a way that reduces the bilateral credit exposure. However, in order to make an early termination the banks involved need to address several important issues that are summarised below:

Both the original counterparties need to agree to the early termination: it could very well be that one of the parties for certain internal reasons does not want to terminate a particular trade.

The counterparties need to establish that they are talking about the same trade: for every deal between party A and party B, party A stores his version of the trade and party B stores his "mirror image" version of the trade in their respective databases. Both parties typically assign their own internal trade identifier to their own version of the trade. There is in general no common identifier or any central register of the trade.

The counterparties need to agree on the value of the trade: since each OTC derivative contract is unique, there is no official valuation of a contract such as by a stock market. Each bank does its own valuation using its own choice of theoretical valuation model, where the model is based on certain inputs that are estimated by each bank. With this subjective method of establishing the value of the contract the parties (banks) normally don't agree on the exact value of any individual contract.

A bank does not want to change its market risk position: whenever a bank has an undesired market risk it does a hedge transaction to cover that risk. If a termination resulted in creating an undesired market risk position, the bank would need to make a hedge trade that would eliminate the advantage of doing the early termination.

A bank does not want to make a large cash payment: a bank with a debt to another party needs to pay out money in order to reduce or settle the debt. The debt arising in OTC derivatives is actually a form of cheap funding for a bank, which means that there is no incentive to repay the debt prematurely. Conversely, the bank with a claim carries the credit risk and also has the associated capital costs. This bank would then like to see that the other party to the contract repaid their debt early. This asymmetric benefit means that early terminations involving the large cash payments necessary for credit exposure reductions are perceived as being disadvantageous and normally do not happen.

A bank does not want to take the initiative for an early termination: since the value of the contract needs to be negotiated in an early termination, the party taking the initiative is at a disadvantage in this negotiation since they reveal their interest first. The other party can then require a valuation, which is in their favour.

All these issues explain why early terminations do not happen to the extent that is economically warranted. The situation is therefore summarised in FIG. 1 in that each bank (financial institution) 10 stores its own version of its trades (transactions) 12, each with its own identifiers (attributes) 14 and its own calculated market data 16. Each bank 10 has an ever-increasing list 18 of such transactions 12. The problem of massive build up of such OTC transactions 12 is becoming more and more significant.

An object of the present invention is to overcome at least some of the above-described problems.

Another object of the present invention is to provide the means necessary for solving each of the above-described issues both individually as well as simultaneously, which issues currently prevent massive early terminations of financial contracts such as OTC derivatives contracts.

SUMMARY OF THE INVENTION

The present invention provides a method and system for doing massive early terminations of OTC derivatives contracts which thereby solves most of the above described problems at their respective roots. More specifically, the present invention significantly decreases the number of outstanding financial derivative transactions between counterparties with the aim of lowering the gross and net credit exposure between counterparties, and/or to lower operational costs and/or risks and/or to enhance risk-control for each counterparty. The present invention achieves these desirable results by a process of collecting trade data from institutions, linking together different versions of the same trade, grouping together potential combinations of transactions having a low or zero risk, calculating the aggregated value of each group of transactions and thereafter selecting the group having the best aggregated value for execution or assignment, namely the group best meeting the party-specified tolerances for the termination or assignment.

The beneficial effect of such a process is that it removes the barriers to mass terminations that have existed previously. The key here is that the differences in valuations of the same transaction by each party can be made insignificant by aggregation of the different valuations (over typically thousands of transactions) which averages out such differences. In addition, aggregation balances out the risks of change in valuation (Greeks) associated with each individual transaction due to their selection. Preferably, the net present values and the Greeks of transactions match in total in such a way that they can considered to be risk-neutral. A risk neutral package of transactions is by definition insensitive to differences in valuation parameters. Hence, there is a high likelihood that the counterparts will agree on the value of such a risk neutral package. Also the value of such a package is not sensitive to market movements or when the mark-to-market values were established. Since the package is risk neutral, the market risk position is unchanged and the counterparties advantageously do not need to make any new transactions to retain their desired market position. The parties are hence more likely to agree to prematurely terminate these transactions. These key features provide the benefit of the present invention to the financial institutions, which is significant.

An important part of the present invention is to carry out trade linking of the different versions of the trades shown in FIG. 1. This is achieved by use of a central site where the relevant trade descriptors are sent, analysed and linked together on the basis of their attributes and market data. This feature is needed in order to create a viable proposal because consent must be obtained by both parties to an OTC derivative transaction prior to its early termination or assignment and so both parties must be able to recognise the transaction using their own systems for providing the consent.

According to one aspect of the present invention there is provided a system for terminating outstanding derivative transactions between a plurality of parties, each transaction being described by a transaction record provided by one of the parties to the transaction, the transaction record including trade details identifying the transaction, the trade details at least specifying two parties to the transaction, the transaction record providing one party's valuation of the net present value of the transaction, and at least one risk characteristic of the transaction, the system comprising: a plurality of data input/output and processing stations for transmitting a transaction record from each party; a central processing station; and a communications network operatively interconnecting all of the stations; wherein the central processing station comprises: linking means for linking together two transaction records from two different parties relating to the same transaction, the linking means being arranged to use a plurality of items of the transaction record to determine records from different parties corresponding to the same transaction; and combining means for combining together a plurality of linked transaction records to determine a termination proposal for terminating a plurality of the transaction records prior to their maturity dates, the central processing station being arranged to transmit the termination proposal to the data input/output and processing stations of the parties involved in the proposal.

According to another aspect of the present invention there is provided a method of terminating outstanding derivative transactions between a plurality of parties, where each transaction is described by a transaction record provided by one of the parties to the transaction, the transaction record including trade details identifying the transaction, the trade details at least specifying two parties to the transaction, the transaction record providing one party's valuation of the transaction market value, and at least one risk characteristic of the transaction, the method comprising: transmitting transaction records from data input/output and processing stations of the parties to a central processing station via a communications network operatively interconnecting all of the stations; linking together at the central station two transaction records received from two different parties relating to the same transaction, the linking step using a plurality of trade details for each record that uniquely identify the transaction of the record; combining together a plurality of linked transaction records to determine a termination proposal for terminating a plurality of the linked transaction records prior to their maturity dates; and transmitting the termination proposal to the data input/output and processing stations of the parties involved in the proposal.

Participating counterparties can set the tolerance-limits on differences in the net present values, maturity dates and/or one or more of the Greeks in such a way that existing exposures between parties can be reduced or conditionally increased. The termination proposal is produced by the system with the explicit aim of reducing credit exposures and collateral obligations, or to prevent collateral obligations from occurring, or to reach a conditional increase in credit exposure, where the aggregated risk of the proposal is minimised. The system also produces a termination proposal, with the aim of reducing the variability of the exposure.

The system may be arranged to produce legally-binding trade terminations if all pre-agreed parameters are met. This minimises the need to seek approval after the proposal has been drawn up.

A termination should be interpreted as follows. It can either be a direct contractual agreement to tear up an existing contract, or to enter into a new inverted contract if there exists a way of legally cancelling two such mirror deals. A termination can also apply between two parties, A and B having the opposite position in a contract, in the case where a third party has taken the place as the counterpart to both these parties and the third party agrees to effectively cancel both A's and B's contracts on request of both A and B. This is also independent of the fact if A and B were the original counterparties in the transaction.

With the help of the central processing station, the combining together step can be expanded to trilateral or multilateral assignment and termination proposals. In this case, the chances are even higher to find packages of transactions that both reduce the net credit exposures and are risk neutral to all involved counterparts. This is due to the fact that when looking at three counterparties A, B and C, in a situation where they have circular claims, i.e. where A has a claim on B, B has a claim on C, and C has a claim on A, all parties can reduce their net exposures by the smallest amount of the claims in question, without having any net cash flow effect. The triangular circular claim can be generalised to groups of more than three parties. If each bank in such a group has both debt relations and claims relations to other banks in the group, each bank will be a part of at least one circular claim, where a circular claim can have more than three other parties in the circle.

In the bilateral case, reducing the credit exposure means that the debtor needs to make a cash payment to the creditor. Only the creditor gets a credit exposure reduction. Also, the two parties may have different funding costs and thereby attach different value to cash. This asymmetric benefit means that it is more difficult to get the parties to agree to perform credit exposure reducing terminations in the bilateral case. The multilateral termination proposals where there are circular claims make the proposal beneficial to all involved parties. Also when three or more parties are involved, two parties, A and B, that have opposite exposures to a third party C, can chose to assign a package of deals with C from A to B or vice verse, in order to reduce the exposure to C. The assignment package can also be combined with assignments to a fourth party D, where both A and B have the opposite exposures as they have to C in such a way that both A and B get a credit exposure reduction. The assignment package can possibly be combined with some terminations between A and B in such a way that the whole package is still cash and risk neutral for both A and B.

From a large population of counterparts that have dealt with each other, there will be many groups of three banks that have circular claims. The number of sub-groups of three out of a population of N parties is proportional to the third power of N. In such a sub-group of three, the likelihood is 25 percent that the claims are circular, if the direction of all claims are evenly distributed in the population.

According to yet another aspect of the present invention there is provided a system for exchanging derivatives related data comprising a number of data input/output and processing stations, an optional central station and a network interconnecting all stations, wherein the parties involved in derivatives related contracts each use a data input/output station to send trade details, the mark-to-market values and the risk-characteristics (indicated as Greeks) for transactions done with other parties using the system, through the network to each other or the central station, where the system is arranged to generate termination proposals consisting of packages of existing transactions, which are beneficial to all involved parties to terminate, according to parameters set by the parties.

According to a further aspect of the present invention there is provided a system for terminating outstanding derivative transactions between a plurality of parties, the system comprising: a processing station arranged to receive transaction data describing a plurality of transactions from a plurality of transaction parties via a communications network, the processing station comprising: a linking module for linking together different versions of the same transaction received from different parties to that transaction; an analysis module for determining a set of linked transactions between a plurality of different transaction parties, wherein each transaction party in the set has both debts and claims towards other parties in the set; a calculation module arranged to calculate an aggregated value of each set of linked transactions and arranged to select the set of linked transactions which has an aggregated value within party-specified tolerance limits acceptable for executing a termination; and an execution module for executing a termination of the selected set of linked transactions.

According to a yet further aspect of the present invention there is provided a method of terminating outstanding derivative transactions between a plurality of parties, the method comprising: receiving transaction data describing a plurality of transactions from a plurality of transaction parties via a communications network; linking together different versions of the same transaction received from different parties to that transaction; determining a set of linked transactions between a plurality of different transaction parties, wherein each transaction party in the set has both debts and claims towards other parties in the set; calculating an aggregated value of each set of linked transactions; selecting the set of linked transactions which has an aggregated value within party-specified tolerance limits acceptable for executing a termination; and executing a termination of the selected set of linked transactions.

BRIEF DESCRIPTION OF THE DRAWINGS

A presently preferred embodiment of the present invention is now described by way of example with reference to the accompanying drawings. In the drawings.

DETAILED DESCRIPTION OF A PREFERRED EMBODIMENT OF THE PRESENT INVENTION

Figure 1:
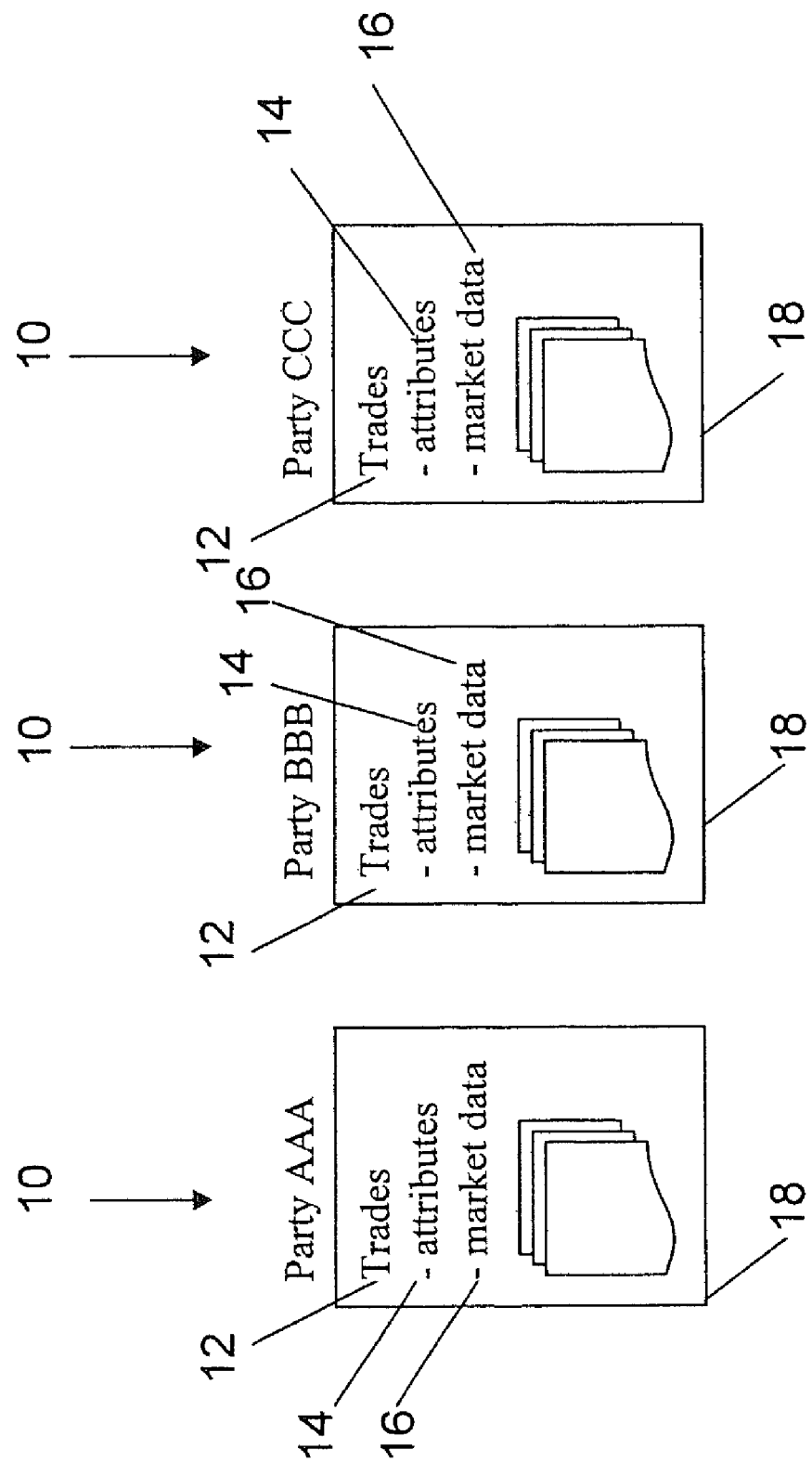
FIG. 1 is schematic block diagram showing the prior art situation where each bank stores its own version of each bilateral OTC trade which it has entered into.
Figure 2:
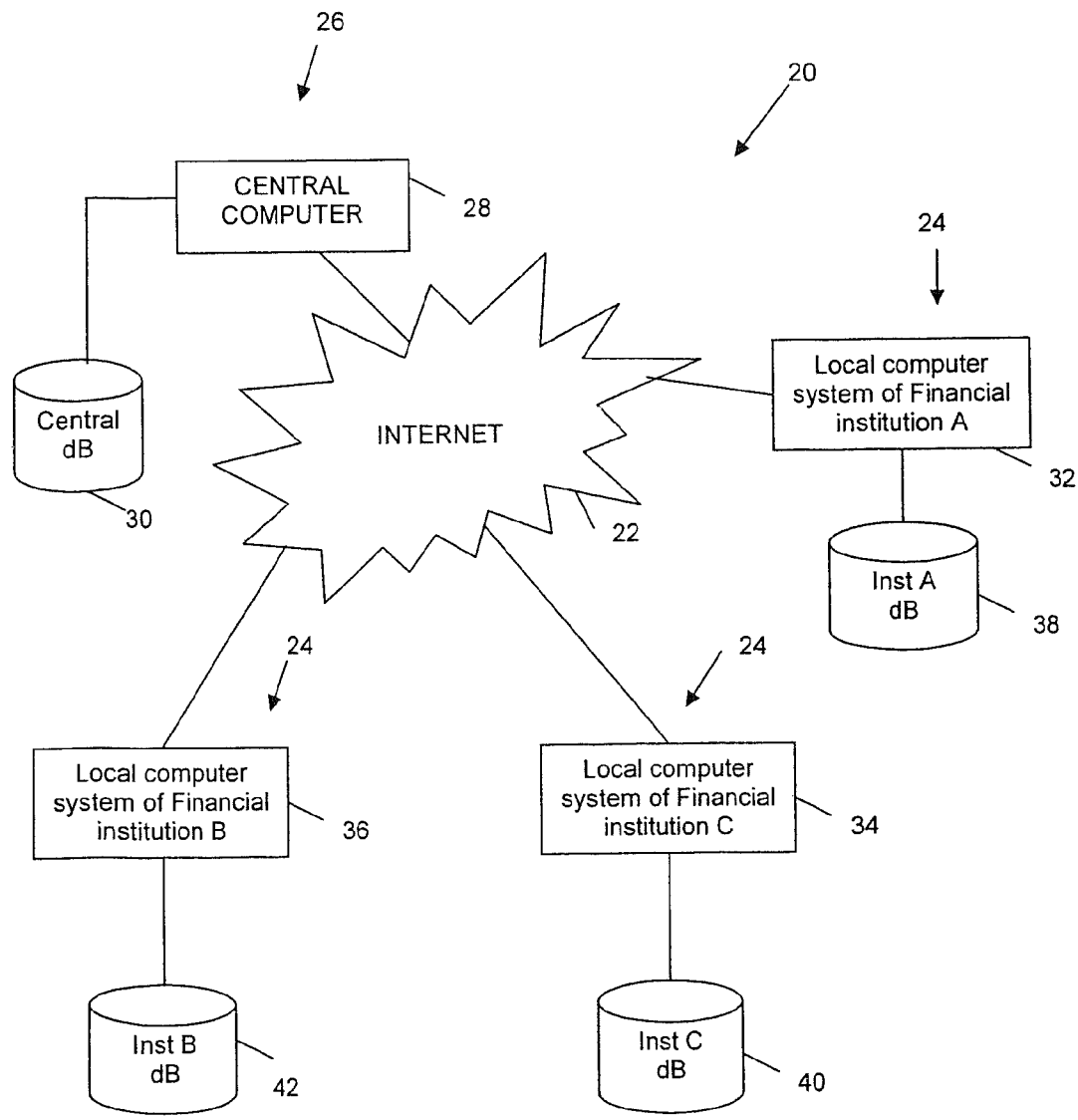
FIG. 2 is schematic block diagram of a system for implementing massive early termination of OTC trades according to a preferred embodiment of the present invention.

A system for executing early mass terminations of derivative contracts according to a presently preferred embodiment of the present invention is shown in FIG. 2. The system 20 is implemented as a network service in that the system provides a communications network (the Internet in this embodiment) 22 connecting institutions 24 trading OTC derivatives with a central site 26, where a secure transfer of data can take place (Data Transfer). At the central site 26, a central computer 28 is provided together with a central database for storing transaction data during the mass termination process. The central computer 28 performs most of the processing to implement the desired mass early terminations as is described in detail hereinafter. Also, the central computer 28 has built in communications capability for interacting with the local computer systems 32, 34, 36 of financial institutions 24. At each of the financial institutions 24, a respective database 38, 40, 42 is provided for storing each institution's trades 12, and their respective trade attributes 14 and market data 16 as shown in FIG. 1.

Figure 3:
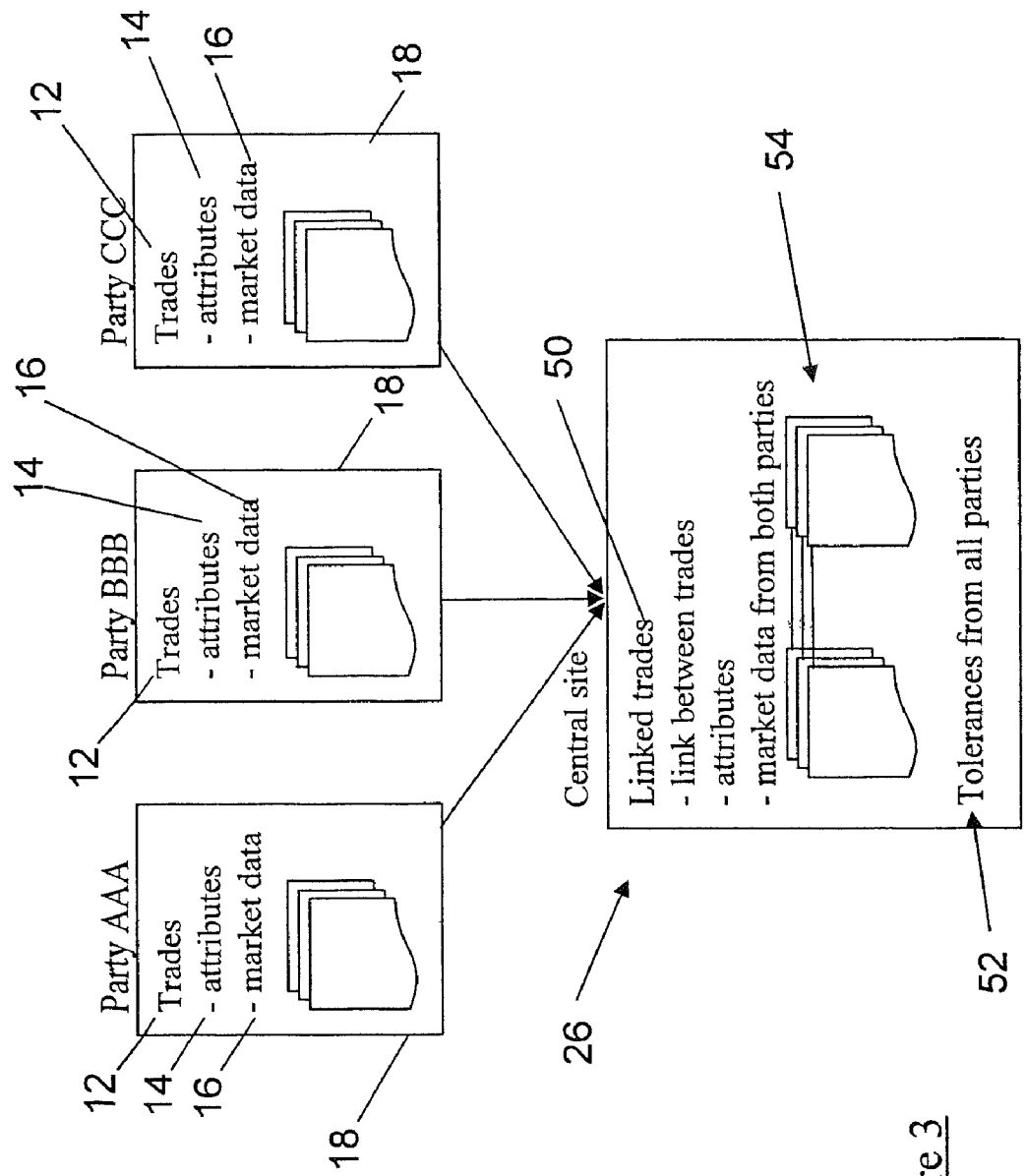
FIG. 3 is schematic block diagram showing how the situation shown in FIG. 1 is resolved by the system of FIG. 2.

The basic process provided by the system 20 is illustrated schematically in FIG. 3. The system 20 acts to connect together the lists 18 of apparently disparate transactions received from each of the different institutions 24 at the central site 26 using the trade attributes 14 and market data 16 provided. The system 20 generates lists 54 of linked trades 50 for each institution 24. Thereafter, the system 20 processes the linked trades 50 such as to effect proposals for mass terminations, which meet the institutions' specified tolerances 52 and on acceptance by the involved parties, to execute those proposals for early mass terminations of OTC contracts. This process is now described in greater detail.

Figure 4:
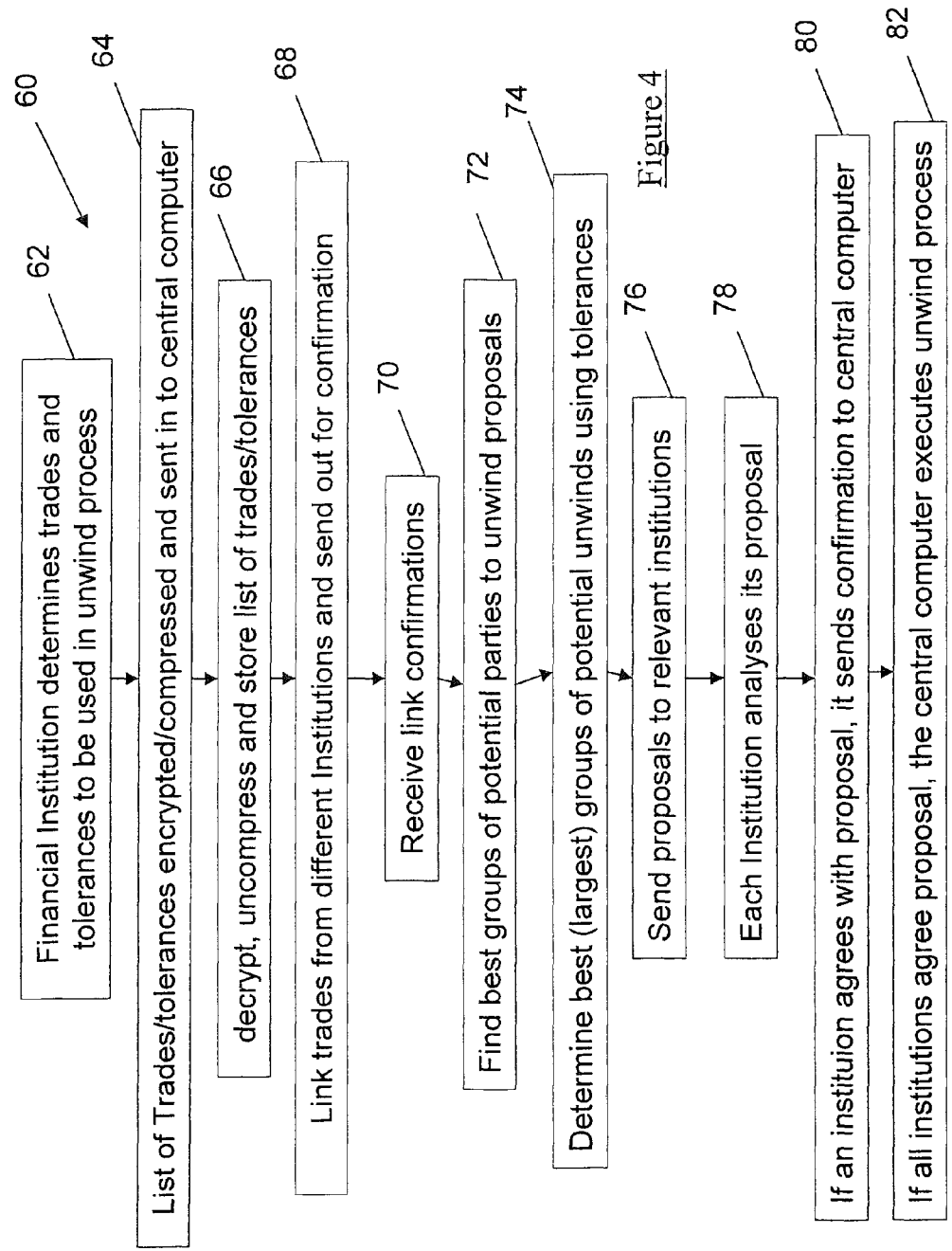
FIG. 4 is flow diagram showing the method of operating the system of FIG. 2.

Referring to FIG. 4, a method 60 of implementing the preferred embodiment of the present invention is now described. The method commences at Step 62 with the financial institutions 24 each carrying out two data determinations, namely determining the trades 12 (trade and counterparty related data) and respective tolerances 52 to be used in an unwind proposal involving those trades. Due to the large number of trades on their books, the institutions 24 generate this data as a list 18 of trades and their related data. These lists 18 of trades and tolerances 52 are encrypted and compressed and are then transmitted to the central computer 28 at Step 64.

On receipt of this data, the central computer 28 decrypts and decompresses the received data and stores the same at Step 66. Trades from different institutions 24 are then linked at Step 68 using matching techniques on the trade details 14, 16. A list of linked trades 54 is compiled for each institution 24 and the list is then sent at step 68 to the institution 24 for confirmation that correct matching of trades has been carried out either externally (by a third party) or internally using the central computer.

The method 60 continues with receipt of confirmations by the central computer 28 from each institution 24 at Step 70. The central computer 28 then carries out a process for determining the best groups of potential parties to an unwind proposal at Step 72, where three or more institutions 24 are preferably involved. Subsequently, at Step 74, the best groups of potential unwinds are determined using the tolerances 52 which have been specified by each of the institutions 24. The best potential unwind is converted at Step 76 into a proposal specifying each party to the unwind proposal, and is sent to those parties for approval. At step 78, each institution analyses 24 its proposal and assuming an institution 24 agrees with the proposal, this is communicated back to the central computer 28 as a confirmation of the proposal in Step 80. The central computer 28 collects all of the required confirmations at Step 82 and executes the unwind process at Step 82.

Figure 5:
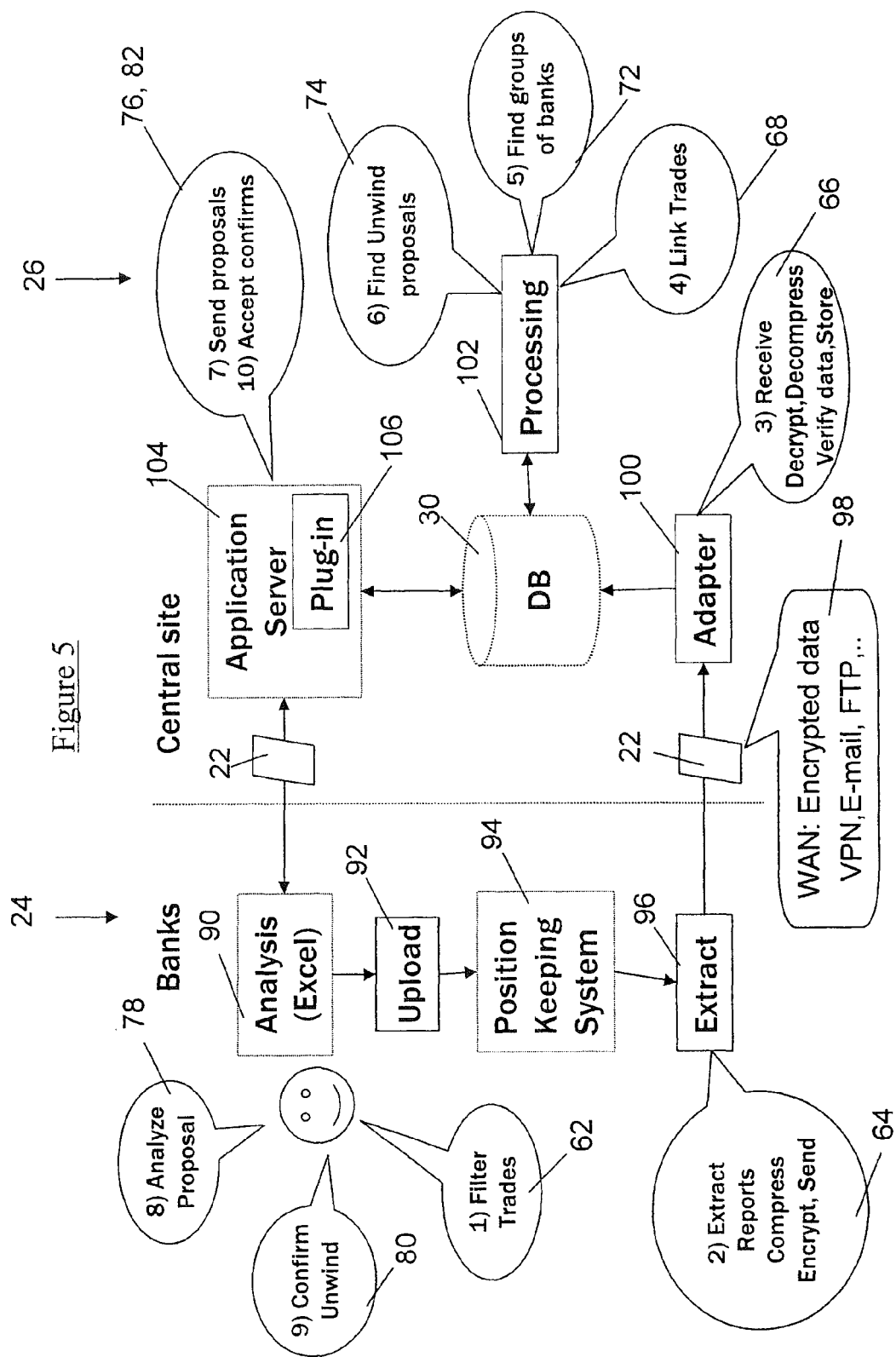
FIG. 5 is block diagram showing the data and workflow process implemented by the system of FIG. 2 in accordance with the method of FIG. 4.

Referring now to FIG. 5, the way in which the above-described method is implemented using specific parts of system is now explained using a pseudo data and workflow and apparatus diagram. For the sake of convenience only the processing apparatus at a single financial institution 24 is shown in FIG. 5, but it is to be appreciated that this apparatus would be replicated at each of the participating institutions' local computers 32, 34, 36.

The institute's existing trades are first analysed using conventional software and these are then filtered at Step to provide lists of potential trades. At this stage, the Institution's tolerances, which would be acceptable with any set of early terminations, are determined. It is to be appreciated that a bank 24 is trading OTC derivatives for a number of different reasons. The vast majority of the trades are market-making trades, i.e. where the bank 24 is both buying and selling and trying to make a profit from the bid-offer spread. Once the bank 24 has bought a contract and sold an equivalent position, and hopefully made a profit, they are more than happy to terminate both these positions since holding them serves no more purpose and only costs them money. Sometimes, the banks enter into OTC derivatives trades for a particular reason. It could be that they want to hedge a particular asset (like a bond) or in general want to manage the overall interest rate exposure of the bank. In such special cases, the bank 24 normally does not want to terminate the trade early, since that would defeat the objective with the trade.

The filtering step 62 involves the banks separating the trades that they want to terminate from the trades they want to keep. This is normally quite straightforward since they typically store these trades in different books or portfolios.

An analysis tool 90 is provided for analysing unwind proposals as is described later. The filtered trades and tolerances are exported using an upload function 92 to a conventional position keeping system 94, which is provided for monitoring the trades or lists of trades which the institution 24 considers suitable for early termination (clearly this need not be all such trades). The position keeping system 94 also records and monitors the status of all trades. Once a record of the selected trades to be sent has been made by the position keeping system 94, the list of selected trades is processed by the extraction function 96. Here, Step 64 of method 60 is implemented with the extraction of reports (lists) for the position keeping system 94, their compression, encryption and sending to the central computer 28. The extraction function 96 is implemented using conventional compression and encryption software, which is suitable for providing the required level of security for this data (see Data Transfer section later). Such software is well known in the art and requires no further explanation herein. Also the transmission of this data is carried out using conventional communications equipment (a modem) for which no further explanation is required.

The encrypted, compressed data can be transmitted over the Wide Area Network (Internet) 22 using any of a variety of protocols, such as e-mail, File Transfer Protocol, 98 etc. At the central site 26, a conventional communications device including an adaptor 100 is provided for implementing Step 66 of the method 60. The decrypted and decompressed data is stored in the central database 30 and is accessible to the processing function 102 present on the central computer 28 to implement Steps 68, 70, 72 and 74 of the method 60. The resultant unwind proposal in the form of lists of specific proposed trades for each institution 24 is forwarded to an application server 104 inclusive of a plug-in, which is provided on the central computer 28. The plug-in tailors the way in which the application server operates to meet the specific demands of the system 20. The application server 104 implements Step 76 of the method 60 securely communicating the proposal over the Internet to the respective institution 24 for consideration and approval. Whilst not shown, the data is encrypted and compressed in a similar manner to that described earlier with respect to the extraction function 96.

At the institution 24, the proposal is decrypted and decompressed (not shown) in the same way as that implemented by the previously described adapter 100. The analysis tool 90 is then used to analyse the proposal in accordance with Step 78 of the method 60. When the institution 24 gets a proposal back they need to verify the proposal. The reason being that the data has passed through a number of processing steps, and there is a small risk of error in each step. Effectively, the proposal is a subset of the information provided by the institution 24. The subset is calculated so that it fulfills the institution's tolerances, as well as those of all other banks being parties to the proposals, simultaneously. The institution 24 only needs to verify that its tolerances are fulfilled and that no error has occurred in the processing of its data.

The institution's local computer 32, 34, 36 then uses conventional communication techniques (e.g. e-mail) to carry out Step 80 of the method 60. When the application server 104 has received all the confirmed approvals, in accordance with Step 82 of the method 60, the approvals are confirmed and the proposal is executed.

Figure 6:
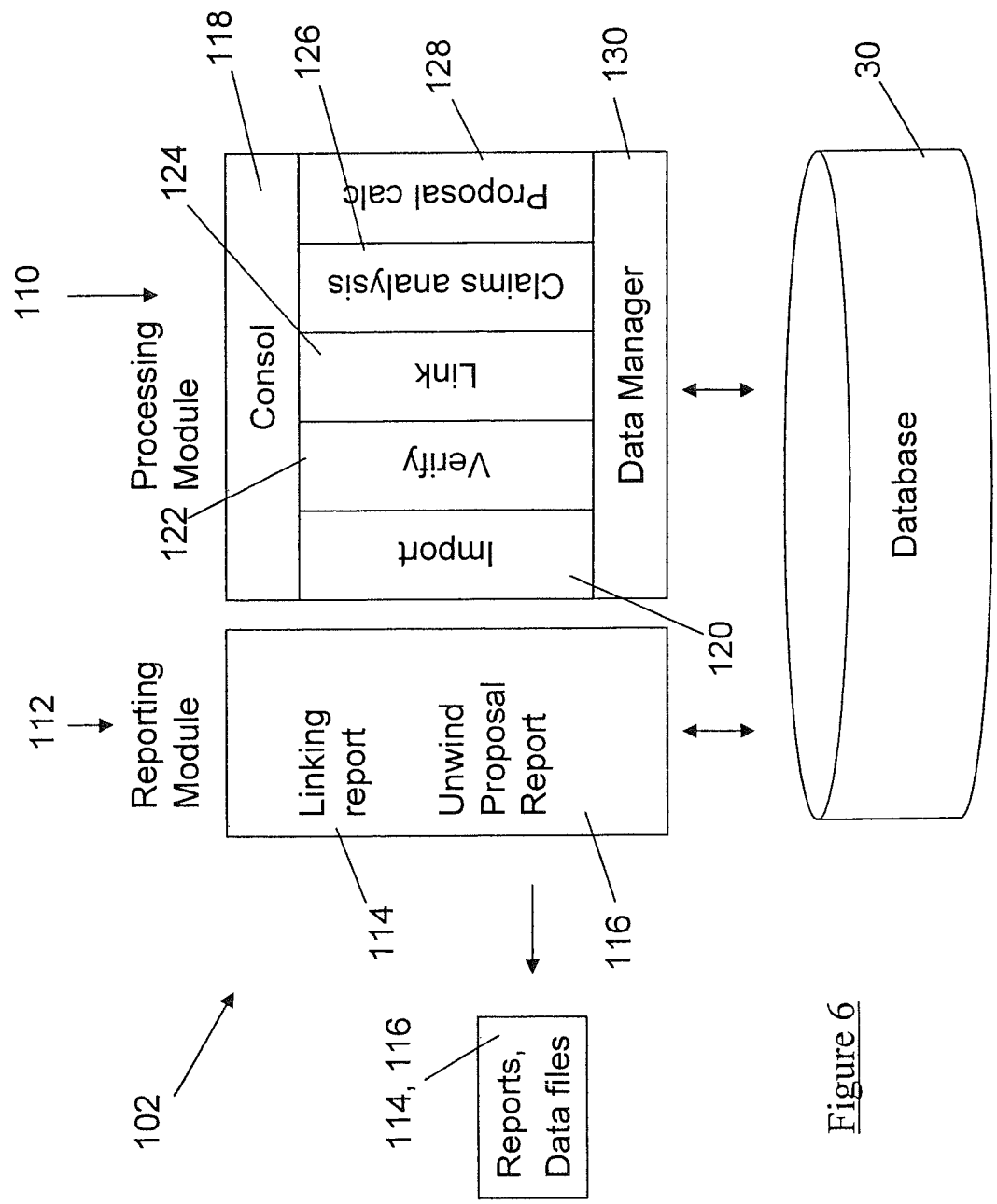
FIG. 6 is a schematic block diagram of the functional modules of the central computer as shown in FIG. 2.

Further details of the composition of the processing function 102 are now provided with reference to FIG. 6. The processing function 102 comprises a core processing module 110 and a reporting module 112. Both the processing module 110 and the reporting module 112 interface to the central database 30 to retrieve and store data in order to implement their respective functions. The function of the reporting module 112 is two-fold, firstly to generate a linking report 114 in according with Step of the method 60 for sending out to institutions for verification, and secondly to generate an unwind proposal report 116 for each institution 24 for their approval.

The processing module 110 comprises a console 118 for enabling operator viewing of progress with the automated process of implementation of the method 60. The console 118 interfaces to the following five modules which implement the heart of the process (method 60). An import function 120, a verify function 122, a link function 124, a claims analysis function 126 and a proposal calculation function 128 are provided in the processing module 110. The import function 120 is provided for controlling the import of data from the institutions 24 using the adaptor 100 in accordance with Step 66 of the method 60. The verify function controls the verification of the genuineness of the received data again using the adaptor 100. The link function 124 implements the linking (matching) of trades in accordance with Step 68 of the method 60. The claims analysis function 126 controls the finding of groups of potential parties to the unwind proposal of the linked trades in accordance with Step 72 of the method 60. The proposal calculation function 128 analyses the results of the claims analysis function 126 and selects the most suitable group of potential unwinds given the benefit to all parties concerned and taking into account the specified tolerances 52, in accordance with Step 74 of the method 60. The processing module also comprises a data manager 130 that manages the many data interactions between these functions and the central database 30.

As has been mentioned previously, the institutions 24 using the networked service carry out two basic initial processes. They send in trade and counterparty related data (described in detail later in the Data Submission section) and define the tolerance for an unwind proposal (described in detail later in the Tolerances section). The central computer 28, on receipt of this data, then carries out a series of processing tasks. Firstly, the central computer 28 links the received trade information (trades) together (described in detail later in the Trade Linking section) and then verifies the trade data (described in detail later in the Trade Verification section). Then the central computer 28 finds groups of banks suitable for unwind proposals (described in detail later in the Claims Analysis section) and calculates unwind proposals (described in detail later in the Unwind Proposal Calculation section). Finally, the central computer 28 transfers the proposals back to the banks involved; and arranges for the acceptance and confirmations of the proposal (described in detail later in the Termination Confirmation section).

Each of the above-mentioned sections is now described in greater detail below.

Data Transfer

The data sent between the participating institutions 24 and the central site is of a strictly confidential nature. In order to ensure that no unauthorised access is made to the data, standard procedures for secure data transmission are implemented. Different institutions 24 may have different policies for data transfer over a network so different methods can be applied for different institutions 24. The methods that are offered by the central computer 28 include:

- Encryption of data using generally available encryption software packages like PGP;
- Using a central FTP site for uploading and downloading the encrypted files;
- Using standard e-mail for sending and receiving encrypted files;
- Creation of a virtual private network (VPN) using generally available solutions; and
- Using a secure web server (https) for uploading and downloading files.

Data Submission

The trades that are considered suitable for unwinding are OTC derivative trades. The methodology is in principle applicable to any type of OTC derivative. In this preferred embodiment description the use has been restricted to single currency interest rate swaps and FRAs for the purpose of clarity. Other types of derivatives would require that other types of trade attributes would be used for linking and other types of Greeks to be used to assess risk neutrality. Single currency interest rate swaps and FRAs simplify the description since they are primarily only sensitive to changes in the level and shape of the yield curve. Hence the only significant Greeks are the deltas with respect to changes in different time buckets of the yield curve. As has been mentioned previously, OTC derivative trades are privately negotiated bilateral contracts, which mean that for every deal between party A and party B, party A stores his version of the trade and party B stores his "mirror image" version of the trade in their respective databases. Both parties assign their own internal trade identifier to their own version of the trade. There is in general no common identifier or any central register of the trade. The only way to get information on the trades that are outstanding is to get the information from the two parties.

The trade related information that the institutions 24 are required to send to the central computer 28 is listed below:

- The set of trades they are willing and able to terminate;
- Trade identifying data used for linking (see Trade Linking section later); and
- Market data (Mark-to-market value and Delta) used in the unwind proposal calculation (see Unwind Proposal Calculation section later)

The linking of trades 12 needs to be confirmed by the institutions 24 before the unwind proposal is calculated. This means that there will be several transfers of data back and forth to the central site 26. In order to relate data in different transfers, each bank 24 is asked to provide a unique identifier on each trade, which is not changed during the process. If the identifier is changed the institution 24 is asked to provide a translation relating the old identifier to the new identifier.

An institution is normally trading OTC derivatives from different branches, subsidiaries, profit centres, departments or books (portfolios). The central computer 28 is arranged to treat these as different trade units, where each trade unit acts as a party in its own in an unwind proposal. This means that the unwind proposal will fulfill the tolerances as defined by each trade unit and there can also be a tolerance aggregated over all trade units from an institution 24. If an institution 24 wants to use the service with different trade units, it should indicate per trade which trade unit that is responsible for the trade.

The institutions 24 normally have a bilateral master agreement to which each trade is referring. The master agreement sets the legal framework for the bilateral trades and contains clauses that are common to all contracts. In most legislations, it is enforceable with provisions in the master agreement that allow for netting the outstanding debt transactions with claims transaction in case the counterparty defaults. This means that, under these circumstances, the credit exposure should be calculated as the net exposure under each master agreement. In some cases, two institutions 24 may have more than one master agreement in place. If that is the case, the institutions 24 are required to provide information by trade on which master agreement it is referring to. The system 20 then ensures that the credit exposure changes from the unwind proposal stays within the tolerance set for each master agreement.

The following trade attributes submitted by the institutions 24 are used in some form in the linking and unwind calculation process.

| Column Name | Explanation | Comment |
|---|---|---|
| TRADE_ID | Trade identifier | Unique identifier on trade |
| CP_ID | Counter party identifier | |
| MA_TYPE | Master agreement type | The type of master agreement relevant for the trade. Example: ISDA, DRV [1]. This field is only relevant if several master agreements with the same counterparty are used. |
| MA_DATE | Master agreement date | The date the master agreement was signed |
| CP_TRADE_ID | Counterparty trade identifier | The counterparty's unique identifier, if available. This helps the central computer in the linking and matching of trades. If not available, the other parameters of the trade can be used. |

-continued

| Column Name | Explanation | Comment |
| --- | --- | --- |
| INS_TYPE | Type of instrument | "Swap [2]" or "FRA [3]" |
| NOMINAL | Nominal amount | |
| CURR | Currency | |
| PAY_REC | Payer or Receiver | Payer or receiver of the fixed rate. E.g.. "Payer", "Receiver" or "1", "0" |
| COUPON_RATE | Fixed coupon rate | Swap rates or FRA rates |
| COUPON_PER | Fixed coupon rolling period | Only required for swaps. E.g. "6M", "1Y" |
| DAYCOUNT | Fixed coupon day count method | Only required for swaps |
| FLOAT_RATE_INDEX | Float Rate index | e.g. "LIBOR [4]" |
| FLOAT_RATE_PER | Float rate period | e.g. "6M" |
| FLOAT_SPREAD | Spread on floating rate | |
| FLOAT_RATE | Current Floating rate | The last fixing made in this contract, excluding spread. |
| TRADE_DATE | Trade date | Date the trade was made |
| START_DATE | Start date | Start date for interest rate calculation |
| END_DATE | End date | End date for interest rate calculation |
| ROLL_DATE | Base date for rolling periods | Only required for swaps with coupons |
| NEXT_FIXING_DATE | Next Fixing Date | See footnote below [5] |
| NEXT_FLOAT_PAY_DATE | Next Floating Payment Date | See footnote below [6] |
| NEXT_FIX_PAY_DATE | Next Fixed Payment Date | See footnote below [7] |
| MTM_DATE | Mark-to-market date | The date for which the mark-to-market was done |
| MTM_VALUE_DATE | Mark-to-market value date | The date for which the mark-to-market is calculated |
| MTM_VALUE | Mark-to-market value | The mark-to-market value is given in the trade currency, and represents the full economic value of the trade (accrued interest is not deducted) |
| MTM_CURR | The Mark-to-market currency | The currency in which the mark-to-market is expressed. Only if it differs from the trade currency |
| DELTA_[{CU}|{DATE}] | Delta per time bucket One column per bucket. Either C = Count, U = Unit e.g. "6M", or a date. | The time buckets (unit periods) that should be used are the time buckets in which the bank will decide if a package of transactions is risk neutral. The more time buckets that are used, the more difficult it will be to find risk neutral unwind packages. |
| DELTA_CURR | The currency of the delta values. | The currency of the delta (if the currency is different from the trade currency) |

[1] Deutsche Ramen Vertrag or translated "German master agreement". This is a template for master agreements developed by a trade organisation for German banks.

[2] An agreement between two parties to exchange regular interests rate payments based on an agreed notional amount for an agreed time period. Normally, in a single currency interest rate swap, the parties exchange fixed interest rates against floating interest rates. For the floating rates, the actual rate for each period is determined by the value of an interest rate index like LIBOR in the beginning of that period.

[3] Forward Rate Agreement, an agreement between two parties that the difference between the agreed forward rate for an agreed single future time period and the actual rate for that period shall be paid by one party to the other, based on the agreed notional amount. The actual rate is determined at the beginning of the period by the value of an interest rate index like LIBOR.

[4] London Inter-Bank Offered Rates, an interest rate index calculated by asking a set of banks what interest rates they are offering to other banks, eliminating some of the highest and lowest offers and then averaging the rest. The LIBOR interest rates are published daily, for a number of maturities (e.g. 3 months, 6 months etc) and are frequently used by OTC derivatives as a basis for determining floating rates.

[5] Trades that have a fixing or payment date between the data collection date and the date the closeout amount should be paid will be excluded from the unwind proposal. Overnight index swaps will still be included.

[6] If the bank cannot supply these data fields, the Roll Date and Roll Periods are used to calculate these dates.

[7] The contracts that has been re-denominated to EUR sometimes have decimals, sometimes not, hence a tolerance of 1 currency unit The counterparty related data that is required is the counterparty identifier used and the aggregated credit exposure for all contracts under the master agreement used for the trades.

The counterparty related data is given in a table with one row for each master agreement that is in place with the other banks participating in the project.

| Column name | Explanation | Comments |
|---|---|---|
| CP_ID | Couterparty identifier | The same as used in the Trade table |
| MA_TYPE | Master agreement type | The type of master agreement relevant for the trade. Example: ISDA, DRV. This field is only relevant if several master agreements with the same couterparty are used. |
| MA_DATE | Master agreement date | The date the master agreement was signed |
| CP_NAME | Descriptive name of the counterparty | Optional |
| EXPO_DATE | The date of the exposure calculations | |
| EXPO_TOT | Total net exposure of all trades under the master agreement, expressed in EXPO_CURR | The exposure should be given as positive for claims and negative for debts |
| EXPO_CURR | The denomination currency for EXPO_TOT | |

Tolerances

Even though there are strong incentives to do unwinds, there are also a few associated issues to be taken into consideration by each party. Each party does not want to:

unwind at an unfavourable value (they don't want to make a loss);

pay out large amount of money;

change their risk profile (delta per time bucket); or increase their credit exposure to a counterparty For each of these considerations there is normally a tolerance beneath which an institution is willing to do an unwind. When checking these tolerances, each party will usually insist on using their own assessment of the value and risk of the trades.

In general, these tolerances are so tight that any individual trade does not meet them. Unwinding is only possible when a package of transactions (a collection of trades) is built where the package in total fulfills the tolerances. In order to construct such a package, it is in most cases necessary to make some partial terminations. However, the parties dislike partial terminations and hence, in the present embodiment there is a tolerance set for how high the ratio of partial terminations can be in relation to the full terminations.

Profit & Loss Tolerances

In order for a financial institution to find the unwind proposal acceptable, any losses should be limited. Each institution therefore defines a loss tolerance, which can be set to zero.

Delta Tolerances

The financial institutions 24 provide a market risk tolerance, i.e., a residual delta that can be accepted as risk neutral for each included currency. This double-sided tolerance (+/−) represents a risk that the bank, under normal circumstances, does not consider to be big enough to be worth hedging.

The delta tolerances may be set on up to four time bucket aggregation levels:

Level 1: Total delta tolerance 0 to 50 years;
Level 2: Twist tolerances 0 to 5 years and 5+ years;
Level 3: Skew tolerances 0 to 2 years, 2 to 5 years, 5 to 10 years and 10+ years; and
Level 4: Time bucket tolerances (according to a set of time buckets selected by each bank).

The purpose of having four levels for the delta tolerance is to ensure that there are no unfavourable accumulation effects over the different time buckets. Assume, for example, that an institution allows a delta tolerance of 10 000 EUR per time bucket they use. Assume as well that they are using 20 time buckets. In the worst case, the deltas of the unwind proposals could all be in the same direction and have a level of 10 000 which would then create a total delta of 200 000 EUR. The tolerance levels 1, 2 and 3 ensure that accumulated delta effects are limited and, hence, that higher tolerances can be given on the $4^{th}$ level.

The first three levels also capture the majority of the interest rate risk in the proposal. It is not required to set tolerances on all four levels. For example, an institution can choose not to set any tolerances on level 4, thereby allowing more delta variations between two neighbouring time buckets.

Figure 12:
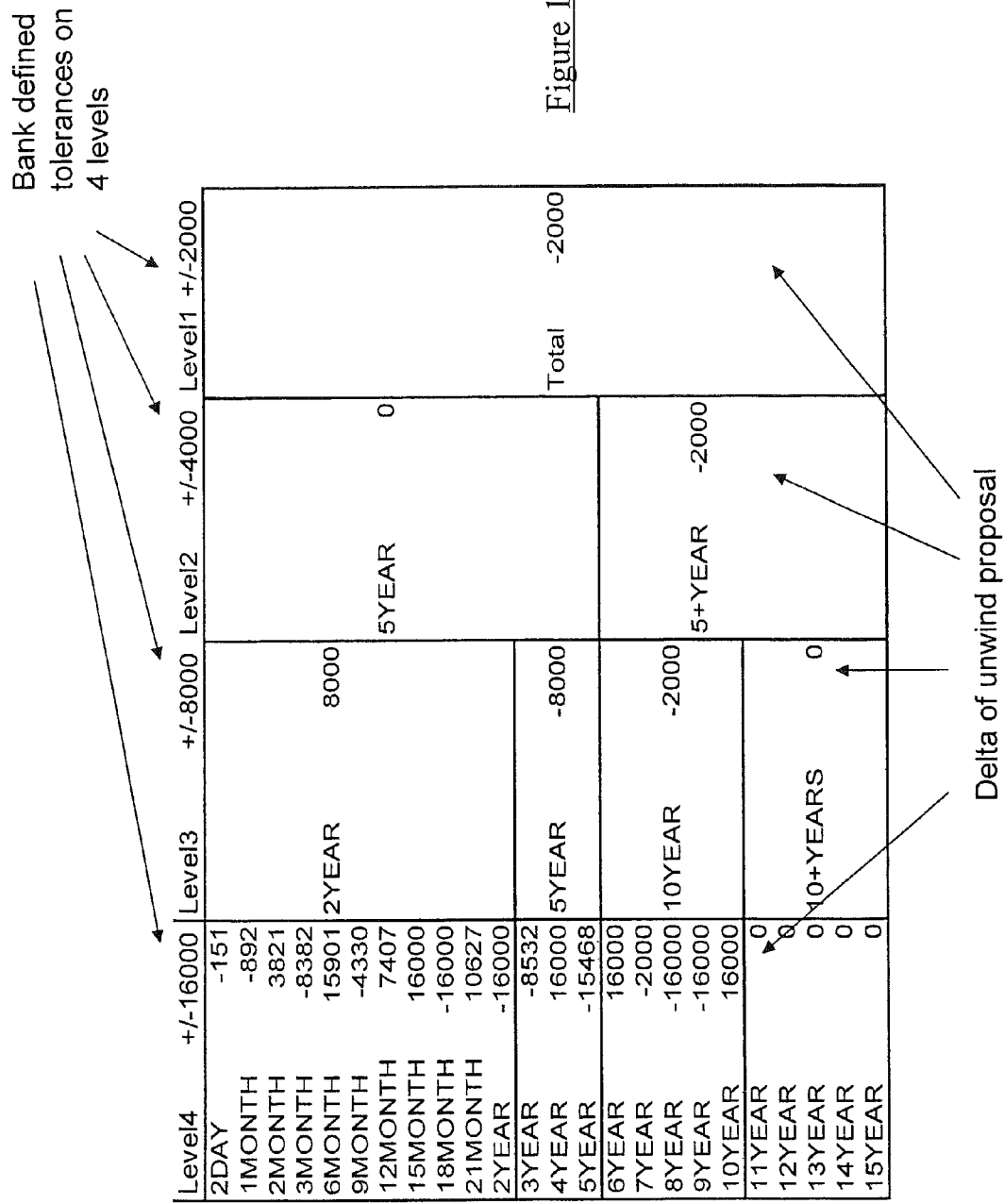
FIG. 12 is schematic diagram showing an example of the delta tolerances on different levels containing aggregated data.

A detailed example of a delta tolerance on multiple levels is provided later with reference to FIG. 12.

Partial Unwind Tolerance

As more partial unwinds are allowed, the chance of creating an unwind proposal that meets all other tolerances increases. Obviously, making partial unwinds increases the workload when actually executing the unwind proposals. A tight partial unwind tolerance also means that a lot of full unwinds cannot be executed. The reason for this is that the package (group) needs to fulfill the delta tolerance per bucket, so in buckets where there are only a few trades all of them may need to be kept to avoid getting a partial unwind. So, there is a trade-off between getting a large number of full unwinds and getting a few partial unwinds.

The tolerance for partial unwinds is given as the number of complete unwinds per partial unwind. For example, a partial tolerance of seven means that seven or more full trades must be unwound for each partial unwind.

Maximum Cash Amount to Receive or Pay

The unwind proposals are required to be approximately cash neutral. The institutions 24 are requested to express the tolerances of paying and receiving cash. The amounts are given in one currency as the total equivalent cash amounts in all currencies to either pay or receive. Maximum Increase of Credit Exposure The system 20 will try to reduce credit exposures as much as possible using groups of institutions 24 having both claims and debts to each other.

A far greater number of transactions can be terminated if a small credit exposure tolerance is permitted for use in Switching credit exposures between two counterparties Increasing credit exposures on some counterparties The credit exposure tolerance should indicate the maximum increase in credit exposure per party.

Trade Linking

An early termination of an OTC derivative trade requires the consent of both parties in the trade. It is therefore required that both parties have submitted their version of the trade to the central computer 28 for unwind processing. The central computer 28 establishes that this is the case by finding and linking the trades that both parties have submitted. Since there is in general no common identifier, the central computer 28 uses the other attributes 14, 16 of the trades 12 in order to see if both parties have sent in their version of the same trade 12. This is done in a process called trade linking.

Matching services are known that provide matching and linking of deals at the moment they are done. SWIFT Accord for example, provides such a matching service. For matched trades there is a common identifier and in that case this common identifier is used for the linking of trades.

Figure 7:
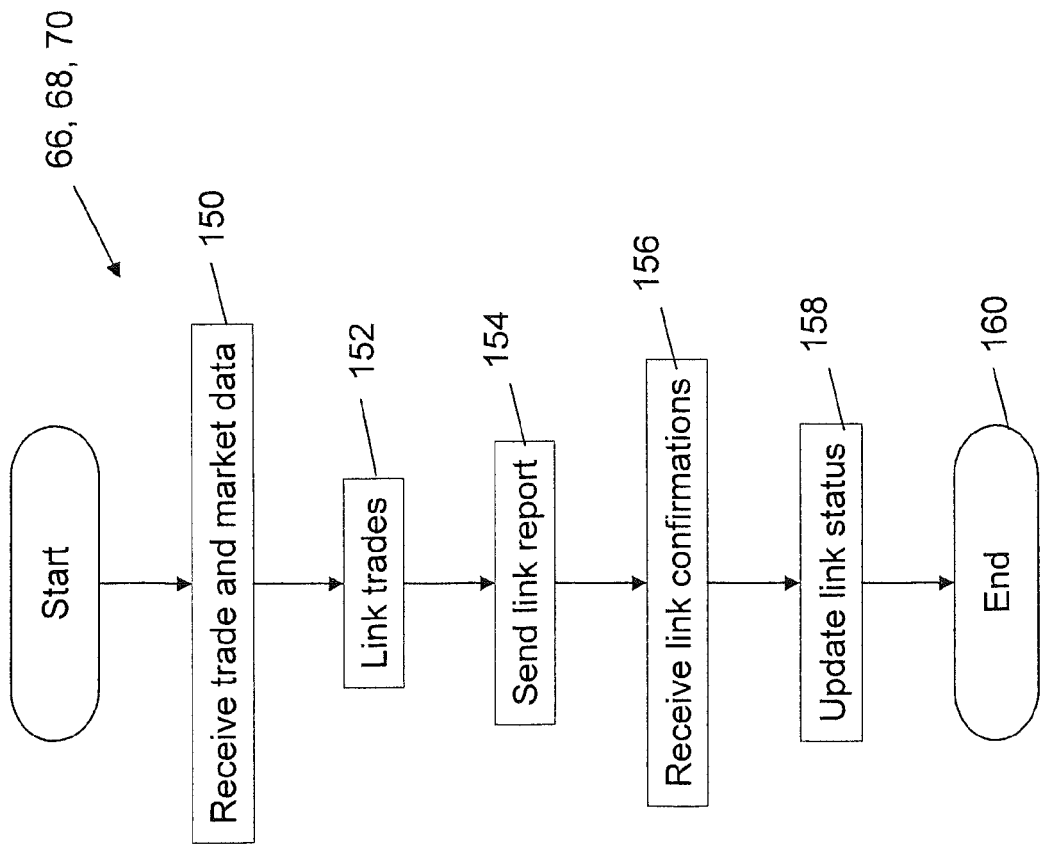
FIG. 7 is flow diagram showing the steps of the trade linking process of FIG. 5.

More specifically, referring to FIG. 7 the trade link process commences with the reception of trade and market data at Step 150 from each of the parties wishing to use the system 20. The central computer 28 then analyses the data (attributes and market data) for each trade and links together different versions of the same trade at Step 152 using a process of matching the received trade describing data. In the present embodiment, the matched trades are compiled into a link report one for each party sending in trades and sent at Step 154 to each relevant party. The parties analyse the link reports and send back their confirmations that the linking has been carried out correctly. These confirmations are received at Step 156 and are used in Step 158 to update the link status. Once this has been achieved the link process ends at Step 160.

Figure 8:
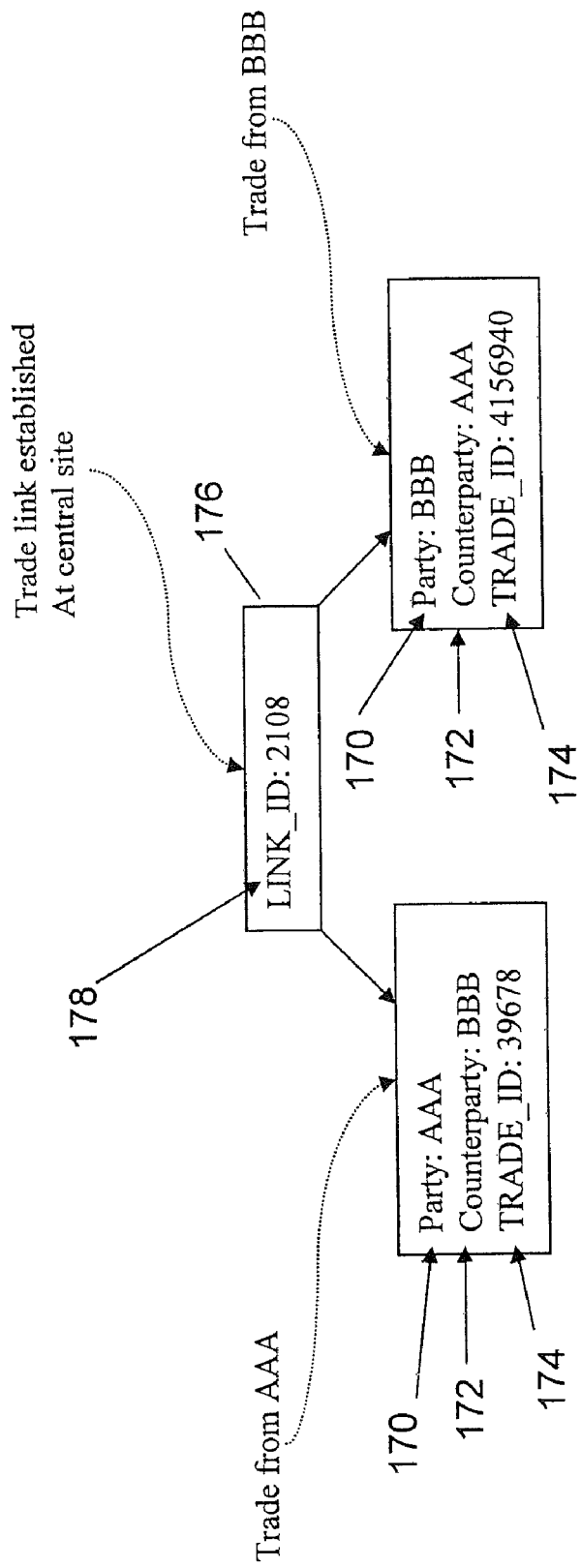
FIG. 8 is schematic block diagram showing how the link between two different parties' versions of the same trade is achieved by the system of FIG. 2.

Referring now to FIG. 8, the way in which the two versions of the same trade are linked together by the central computer 28 is shown. Each version of the trade has an identifier 170 for the party, another identifier 172 for the counterparty and a local trade identifier 174. Whilst local trade identifiers 174 are different, the process at the central computer 28 creates a trade link 176 with a unique link ID 178 to identify the two linked versions of the trade.

In the trade linking process the key financial terms of the deals are used to identify the trade. The key financial terms are different for different types of OTC derivatives, but for swaps the following attributes are used:

The counterparties
The nominal amount
The currency
The end date
The fixed coupon
Pay or receive of the fixed coupon In addition several other attributes can be used, but practically, it is very unlikely that two counterparties have dealt two identical trades (in terms of the attributes listed). Even if they have, the contracts are normally identical which means that any ambiguity can easily be resolved by just picking one pair of the matching trades.

Link Status

The initial linking process operates on the trade data submitted and produces a list of trade links having one of the following statuses:

Tentative
Suspected
Ambiguous

A 'Tentative' link is a link between two records that basically match in all the compared fields (as defined below) and thereby with very high likelihood refers to the same original transaction. A 'Suspected' link is a link between two records that basically match in all the compared fields but where some minor error requires further attention. An 'Ambiguous' link is a link where several records match in the compared fields. The list of initial links is send to the involved parties and the parties are asked to verify and confirm the links. For each link in the list, the parties are asked to indicate whether there is a match or not. This is indicated by changing the status to:

Confirmed
No Match

The unwind process then only uses the trade links in status 'Confirmed'.

Compared Fields

The following fields are used in the trade record comparison. (Detailed explanation of the fields, provided in Data Submission section.)

CP_ID (counterparty identifier)
CURR
NOMINAL
PAY_REC
FIXED_COUPON
FIXED_ROLL_PERIOD
FLOAT_RATE_INDEX
FLOAT_RATE_PERIOD
FLOAT_RATE_SPREAD
END_DATE These fields either must match exactly or within a certain tolerance. The fields also have a certain difference factor as described below. The linking algorithm calculates a total difference factor for all combinations of two trades sent by two counterparties. The total difference factor is calculated by summing the difference factors from the individual fields, when they deviate more than the tolerance. Then, there are limits defined on the total difference factor for giving a classification as 'Tentative', 'Suspected' or 'Ambiguous'. For fields having more than one tolerance, the one with the highest difference factor is tested first.

| Field | Tolerance | Difference factor |
|---|---|---|
| CP_ID | None | Infinite |
| CURR | None | 0.45 |
| NOMINAL | >1 currency unit [8] | 0.45 |
| FIXED_COUPON | >0.0001% | 0.45 |
| | >0.000001% | 0.01 |
| FIXED_ROLL_PERIOD | None | 0.02 |
| FLOAT_RATE_INDEX | None | 0.05 |
| FLOAT_RATE_PERIOD | None | 0.01 |
| FLOAT_RATE_SPREAD | >0.0001% | 0.02 |
| END_DATE | >4 days (unadjusted) [2] | 0.5 |
| | >2 days (business day adjusted) | 0.5 |
| | >0 | 0.01 |

[2] Some banks store business day adjusted end dates, others unadjusted dates.

Comments

The fields CP_TRADE_ID, TRADE_DATE and START_DATE are not used in trade linking since the experience shows that many banks change these fields in situations like systems migrations, trade re-denominations etc.

All banks need to supply translation lists for how they denote counterparty ID, float rate indices and daycount conventions. Experience has shown that it is quite difficult to get to any agreement on daycount conventions, since many banks find it hard to translate their internal codes to a standard format. For this reason, daycount method is also not used in the trade linking process.

Classification of Link Status

In order to qualify as a 'Tentative' link, all fields have to be within the tolerances, i.e., the total difference factor should be 0.0. In order to qualify as a 'Suspected' link, the total difference factor should be less than 0.1. If several trades have the same total difference factor and qualify as Suspected, they are marked as 'Ambiguous'.

With the difference factor set as above this means that the fields used in the linking can be divided in two categories:

Major attributes—Counterparty, currency, nominal, fixed coupon and end date
Minor attributes—rolling periods, float rate index and spread In words, the linking criteria can then be described as:

If the one of the major attributes did not match, there is no match.

If only a few of the minor attributes did not match or if some of the major attributes deviated, but less than the tolerance, there was a suspected match.

The linking of trades is then tested during the trade verification process.

Trade Verification

The central computer 28 verifies the data sent by the banks. This test is done after the linking of trades and on all subsequent data transmissions in order to detect any mistakes in the valuations. The test is carried out by comparing how many interest rate basis points(a basis point is 0.01%) the mark-to-market values are apart.

This is done by dividing the difference in the mark-to-market valuation by the total deltas as supplied by the parties. The delta is normally expressed as the change in value of a contract given a basis point shift in interest rates. The following tolerances are used to filter out possible suspected errors:

| Remaining maturity | Tolerance in basis points |
| --- | --- |
| <1 month | 15 |
| <6 month | 8 |
| <1 year | 5 |
| 1 year + | 3 |

Claims Analysis

The purpose with the claims analysis is to find groups of banks for which an unwind proposal should be calculated. The selection criteria is that the banks in such a group should have both claims and debts towards each other, and ideally the sum of the claims should equal the sum of the debts for each bank. If that is the case, the potential for credit exposure reduction is maximised.

The number of ways of selecting groups of banks grows quickly the larger the population to select from and the larger the group being selected. However, the OTC derivative trades are bilateral which means effectively that each bilateral relationship only needs to participate in one unwind proposal at the time. When a bilateral relationship has been used in an unwind proposal it will be exhausted and it will take some time of continued trading before a sufficient number of new trades have been made in order to make it possible for that bilateral relationship to take part in a new unwind proposal.

The selection process is therefore focused on selecting which bilateral relationships rather than which parties that should take part in an unwind proposal. To clarify, even if both bank A and bank B take part in an unwind proposal X it does not necessarily mean that the trades between bank A and bank B are used in the calculation of the unwind proposal X. Instead, bank A and bank B can also be parties in unwind proposal Y where the trades between A and B are used.

To be even more specific, the credit exposure reduction needs to be found in relation to each master agreement. This means that the selection process is focused on finding the set of master agreements that should take part in an unwind proposal. A master agreement taking part in an unwind proposal means that the OTC derivative contracts referring to that master agreement are used in the calculation of the unwind proposal. The vast majority of banks only have one master agreement with each counterparty under which they trade swaps so in practical terms the master agreements can be thought of as bilateral relationships.

The number of bilateral relationships in a group of banks is equal to $n*(n-1)/2$ where n is the number of banks. For example if n=100 the number of bilateral relationships are 4950 (100*99/2).

In the selection process other issues need to be taken into account in addition to the bilateral claims. The total number of trades in each proposal needs to be manageable for each bank. In practical terms this means that the number of trades per bank should not exceed a few thousand. On the other hand, efficiency in terms of the ratio of fully unwound trades to the total amount of available trades increases the more trades there are to work with in an unwind proposal. This means that each bank should have at least a few dozen trades with the other parties in a proposal in order to make it worthwhile to participate.

The Exposure Matrix

The credit exposures sent in by the institutions 24 are summarised in an exposure matrix. The banks are ordered in an unambiguous way and each bank is assigned the ordinal number according to this ordering. The exposure matrix is a square matrix having the same number of rows and columns as the number of banks participating. In a cell on row i and column j of the matrix the claims or debts according to the bank with ordinal number i towards the bank with ordinal number j are noted. The claims are entered with a plus sign and the debts with a minus sign. The banks do not in general agree on their credit exposures so any claim or debt that bank A thinks it has on bank B is in general not equal to minus what bank B thinks it has on bank A. In case two banks have more than one master agreement, a third dimension in the matrix is opened and indexed with k where k can have the values from 1 to the number of master agreements which are ordered in an unambiguous way.

The matrix for a single master agreement may look something like that set out in Table X:

TABLE X

| Parties | A | B | C | D |
| --- | --- | --- | --- | --- |
| A | 0 | −4 | 3 | 1 |
| B | 4 | 0 | −2 | 3 |
| C | −3 | 2 | 0 | −2 |
| D | −1 | −3 | 2 | 0 |

Reading from the row of party A it can be seen that A has a claim on C of 3. Inversely, reading from the row of party C, it is apparent that C has a debt to party A of −3. The matrix is hence approximately anti-symmetric in the sense that $a[i,j]=-a[j,i]$. This is only approximate since the parties may have different opinions on the value of their existing bilateral deals.

In case the parties have different opinions about the exposures, the central computer 28 can work with the non-disputed amount, i.e. the smallest exposure value in absolute terms, i.e. a value that is not in dispute. Working with the non-disputed amount guarantees that the matrix is anti-symmetric, i.e. that $a[i,j]=-a[j,i]$. In case both parties think they have a claim on each other or both parties think they have a debt to each other, the non-disputed amount will be zero.

In case a bilateral relationship is not to be utilised in an unwind proposal, this can be indicated by having an availability matrix of the same size as the exposure matrix where a value of 1 indicates that the relationship should be considered or 0 to indicate that the relationship should not be considered. In case a bilateral relationship has recently been used in a proposal, and therefore there are only a few transactions left, that relationship is marked as unavailable.

Figure 9:
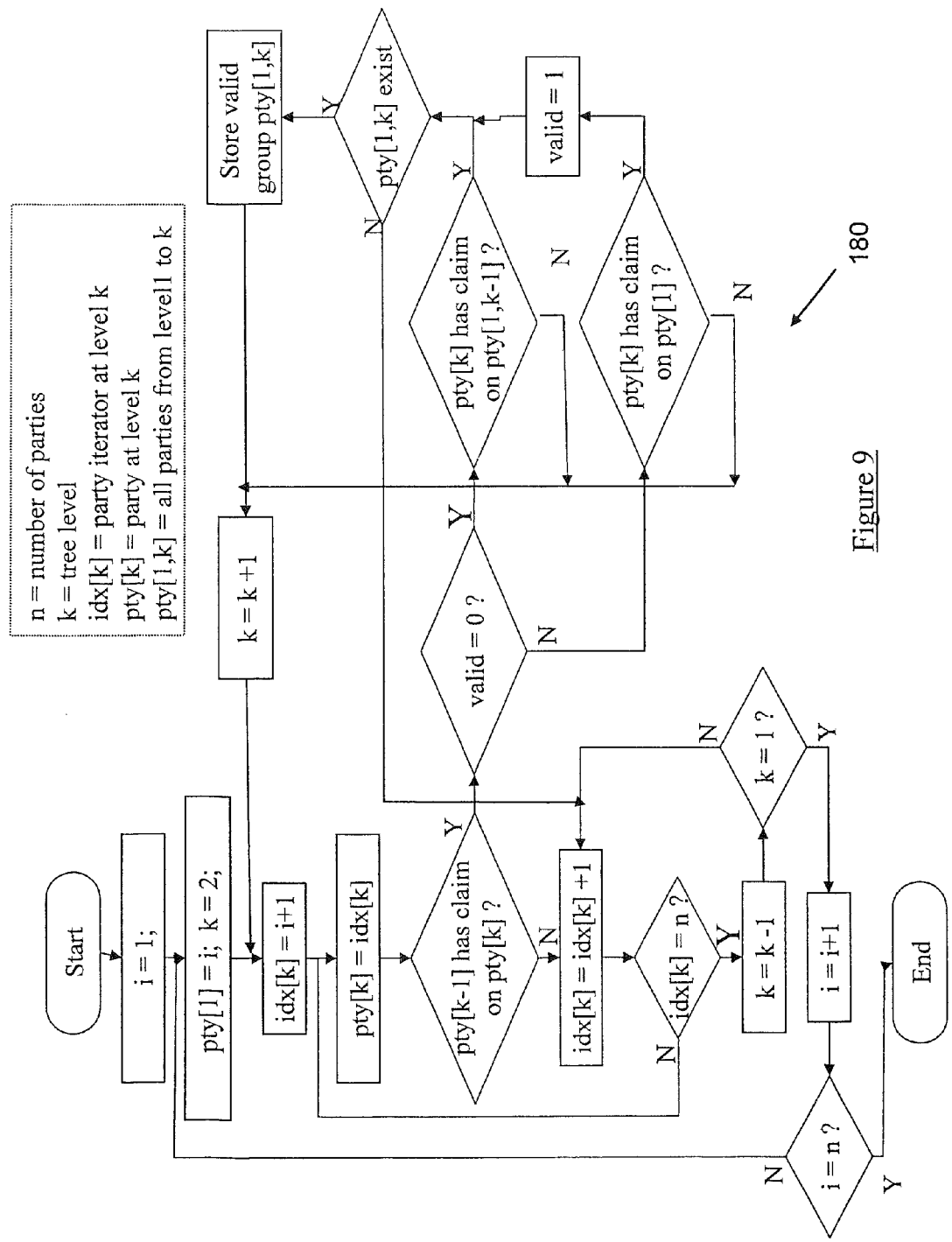
FIG. 9 is a flow diagram showing a branching process used in the step of calculating of groups of banks as suitable candidates for a possible unwind process of FIG. 5.

Finding suitable groups of banks involves the following tree branching process 180, which is now described with reference to FIG. 9. The process 180 is described in detail in FIG. 9, such that the step-by-step implementation of the tree branching process can be carried out. However, for the sake of convenience, the following general description of the tree branching process 180 is provided in the text for ease of understanding.

The process 180 starts with the first party putting themselves as the root node of a complex tree branching process. The columns on that party's row are looked through in order to find other parties where this bank has an available claim. When a claim is found in a column, that bank's name is placed in a node on level two of the tree. That party's row is then considered for other available claims. When a new available claim on that row is detected, the third party is placed in a node in position three of the tree. From the third party and onwards, the algorithm also starts looking to see if they have a claim on the bank in the first node in the tree. If so, the group of banks has both claims and debts towards each other and is a valid candidate group for unwind proposals. The process 180 then continues to look for parties that have claims on others and whenever a claim exists on the first party in the tree, or if such a claim has already been encountered, on any of the preceding parties in the branch, a valid group is found. The valid groups are then stored.

When the process has been completed for the first bank, all possible groups involving the first bank have been found. Continuing with the other banks in the first position, it is apparent that any tree branching that leads to the first bank can then be terminated since it will be a duplicate. The fact that most branches get terminated long before all possible claims are tested, means that the number nodes to search is reduced significantly. Also, the fact that only a fraction of the possible bilateral relationships are available in each round also reduces the number of nodes and branches.

A non-limiting example to clarify the above-described tree branching process 180 (algorithm) is now set out below:

First the algorithm starts with bank A and puts them in a node in the first position.

1) A

From the exposure matrix, the algorithm determines that A has claims on C and D, which are put in the second position 1.1) A–C 1.2) A–D Continuing with the first open branch, C only has a claim on B, which is then put in the third position 1.1.1) A–C–B 1.2) A–D B then has a claim on A and D. The fact that A appears means that the group ABC has both claims and debt to each other. This is marked this with a star (*) in the diagrams below. This group is stored in the valid group list.

1.1.1.1) A–C–B*–A!

1.1.1.2) A–C–B–D 1.2) A–D

Since B had a claim on A it then the fact that D has a claim on C means that the group ABCD also is valid and it is stored in the valid list. There are no more claims to analyse for D on level 4, which is marked with an exclamation mark (!) as shown below.

1.1.1.1) A–C–B*–A!

1.1.1.2) A–C–B–D*!

1.2) A–D

The algorithm continues with 1.2) and finds that D has a claim on C.

1.2.1) A–D–C

C then has a claim on B.

1.2.1.1) A–D–C–B

The algorithm also determines that B has a claim on A, which means that ABCD is valid. When the algorithm tries to store ABCD it determines that this group has already been stored in the valid list so the branch of the tree is dropped.

At that point, A in the first position has been exhausted and all valid groups involving A have been found. This means that whenever a branch with a node that has already been exhausted is encountered, that branch is dropped.

Continuing with B in the first position, the algorithm provides:

2) B

B has claims on A and D, where the branch with A is already exhausted so it is dropped which is marked with a plus sign (+):

2.1) B–A (+)

2.2) B–D

D then has claims on C 2.1) B–A (+)

2.2.1) B–D–C

And C has claims on B, so BCD is put in the valid list.

2.1) B–A (+)

2.2.1) B–D–C*

With only two parties remaining to be explored in the first position, there are no more possibilities to find valid groups that have not been found before so the process is stopped.

As a summary, at the end point the algorithm has determined the following branches and valid groups:

1.1.1.1) A–C–B*–A!

1.1.1.2) A–C–B–D*!

1.2.1.1) A–D–C–B!

2.1) B–A (+)

2.2.1) B–D–C*!

The valid groups are ABC, ABCD and BCD.

The process above will generate all possible groups where there are both claims and debts towards each other. However, the same bilateral relationship may appear in many groups. In theory, the same relationship can be used in several proposals but in practise, the chance of confusion and mistakes are higher so it is in general avoided. In order to find the best groups they can be ordered along any of two criteria—the reduction number and the number of trades.

For each group, there will be a reduction number, representing the exposure reduction possible in the group. The reduction number is calculated in the following way. Calculate the sum of all claims and the sum of all debts for each bank towards the other participants in the group. The reduction number for a bank in a proposal is the smallest absolute value of the sum of the claims and the sum of the debts. The reduction number for the proposal is the sum of the reduction numbers for each bank in that proposal.

For each valid group, the number of trades that are available for the unwind calculation can be determined. As noted above, there are for practical considerations a floor and a ceiling on the suitable number of trades for each bank in each proposal, which means that many valid groups can be filtered out of further consideration.

As the same relationship should not be used on more than one proposal, groups that contain the same bilateral relationship as a group already selected are also filtered out of further consideration.

Unwind Proposal Calculation

Once the group of banks that should participate in an unwind proposal is selected, the actual unwind proposal calculation can start as is now described with reference to FIGS. 10 and 11.

Since unwinding is done using linked trades, the package of transactions in the unwind proposal must simultaneously fulfill all involved parties' specified tolerances. This also means that the unwind proposal must be accepted by all parties simultaneously and in full. If one party rejects the proposal, the whole proposal is rejected. If one trade in the package is removed, the proposal will (most likely) no longer fulfill all tolerances. Hence, there is no possibility to alter the proposal by removing individual trades. The proposal also contains a net close out amount to be paid or received by each party. This close out amount is a part of the proposal and cannot be negotiated.

In order to find a package of trades that fulfills all involved party's tolerances simultaneously, all tolerances must be incorporated into the solution algorithm. At the same time the objective is to find a package where as many full trades as possible are terminated. Typically, this results in each selected proposal not having more than five to seven parties, otherwise the proposal can get too complicated and inefficient. Thereafter, the largest set of trades that fulfill all parties' tolerances is determined for the proposal. The first step is necessary as there may typically be hundreds of parties subscribing to the network service. Eventually, it is desired to cover all bilateral relationships in a proposal. However, how the groups are selected affects the amount of credit exposure reduction than can be achieved (this method has been described above in the claims analysis section).

The problem is of the nature of "constrained optimisation". The constraints and the optimisation goal function are linear which means that a standard method for linear programming can be used. Accordingly, the first step of the Unwind Proposal Calculation process 250 at step 252 is to solve this Linear programming problem. This is solved as is described below.

A linear programming (LP) problem is of the form:

maximize $c^T x$ subject to $lv \leq x \leq uv$ $lt \leq Ax \leq ut$, where x, c, lv and uv are n element vectors, lt and ut are m element vectors A is an m by n matrix.

n is the number of variables m is the number of general constraints

There are a vast literature and a number of standard software packages available for the solution of linear programming (LP) problems. A detailed description of a solution method for linear programming problems can be found in "Dahlquist, Björck, Anderson (1974) *Numerical Methods* Prentice Hall, Englewood Cliffs, N.J.". The following exemplary description is only intended to show how the unwind proposal calculation problem is formulated as a standard LP problem.

In order to formulate the unwind proposal calculation problem as a linear programming problem, all the linked trades and the tolerances should be ordered in an unambiguous way so that each linked trade and each tolerance gets a unique ordinal number.

In this particular case, the variables (x) will be the part of the linked trades that will be terminated. A value $xi=1.0$ then means that trade number i will be completely terminated. A value $xi=0.0$ means that the trade should be kept on the books as it is. A value $xi=0.5$ means that the trade should be partially terminated to 50% which is done by changing the nominal amount of the trade to 50% of its current value.

Each variable must be less or equal to 1.0 since more than a full trade cannot be terminated. Each variable must also be greater than or equal to 0.0 since a negative value would mean that the parties holdings of an existing trade would increase. In the LP problem case this means that all elements of the vector lv should be 0.0 and all elements of the vector uv should be 1.0.

The element of the vector c is the weight each linked trade has in the optimisation goal function. The absolute value here is of no concern, only the relative values between the elements are important. In case all trades should be weighted the same, all elements of c can be put to 1.0. In case the optimisation should try to terminate as many long dated and large trades as possible, the value of $ci$ could be set to the remaining time to maturity multiplied by the nominal amount of the trade i.

The elements in the matrix A and vectors lt an ut are found by the following procedure. Each tolerance defined by each party will constitute one row in the matrix. For example, if bank A has set a total delta tolerance of +/−3000 EUR and this tolerance has been assigned the ordinal value j, the value of ltj will be −3000 and the value of utj will be +3000. The matrix values Aij will be the total delta of trade i as calculated by bank A in case bank A is a party in trade i. If bank A is not a party of trade i, Aij will be zero.

The double constraints $lt \leq Ax \leq ut$ can be reformulated as two normal single constraints like:

$Ax \leq ut$ $-Ax \leq -lt$

One-sided tolerances, i.e., where there is either just a lower bound or an upper bound, are handled by ignoring the corresponding single constraint. This reformulation will be denoted as:

$BX \leq u$

Where B is an M by n matrix where M is the number of applicable single constraints. These inequalities will be called the general constraints. For the purpose of reducing the number of partials, the right hand vector u will be multiplied with a scale factor as described later. The constraint above is equal to:

$$\text{For all } j = 1 \text{ to } M: \sum_{i=1}^{n} Bij * xi \leq uj$$

Once the LP problem has been solved, the next step in the Unwind Proposal Calculation process 250 is to remove the scale factor from the general constraints at Step 254. The way in which this is carried out is explained in detail later with reference to FIG. 11, which shows this step in detail.

Reducing the Number of Partial Terminations

In realistic situations, the solution of the LP problem above will be that most trades will hit the constraint=1.0, i.e. that they should be completely terminated. However, there will also be many trades that are partially terminated since the optimisation goal function favours a solution where a trade is terminated to 20% compared to not being terminated at all. Since the value for the banks of a partially terminated trade normally does not exceed the cost of handling the partial termination, this is an unsatisfactory solution. It could also be that the number of partials in relation to the number of full unwinds is so large that the partial tolerance is not fulfilled. In order to reduce the number of partial terminations the following procedure can be applied.

Figure 10:
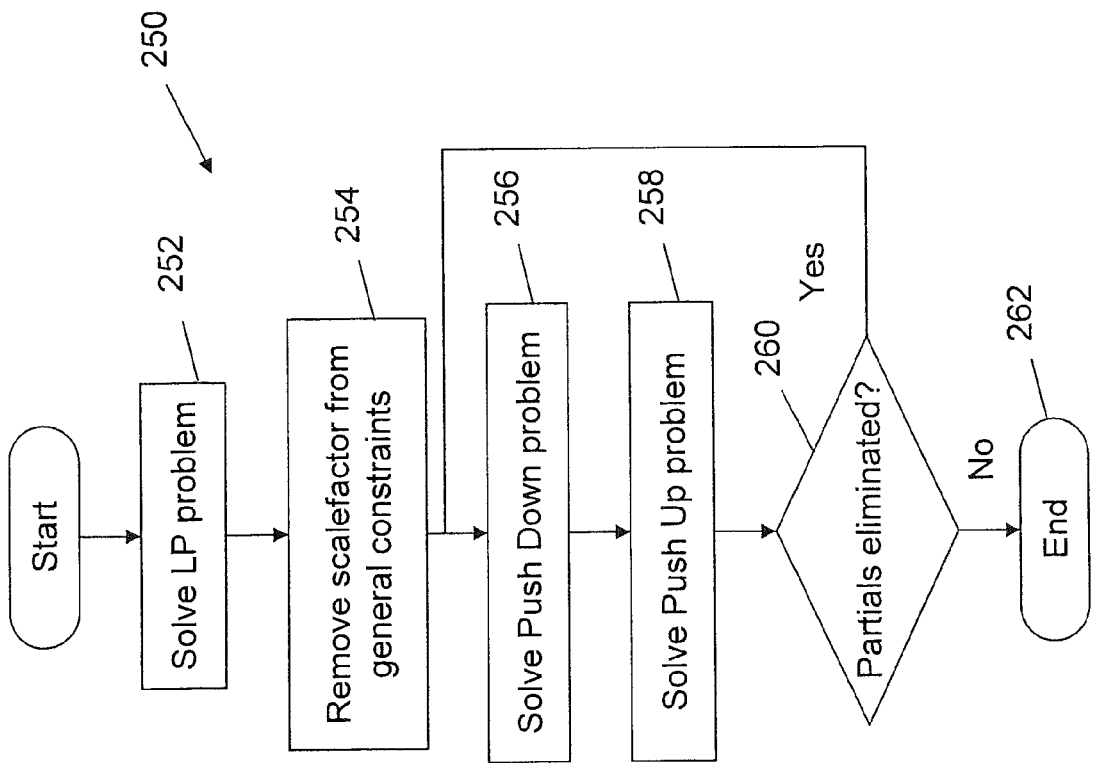
FIG. 10 is flow diagram showing the unwind proposal calculation step of FIG. 5 which is used to calculate the best unwind proposal given the party-specified constraints.
Figure 11:
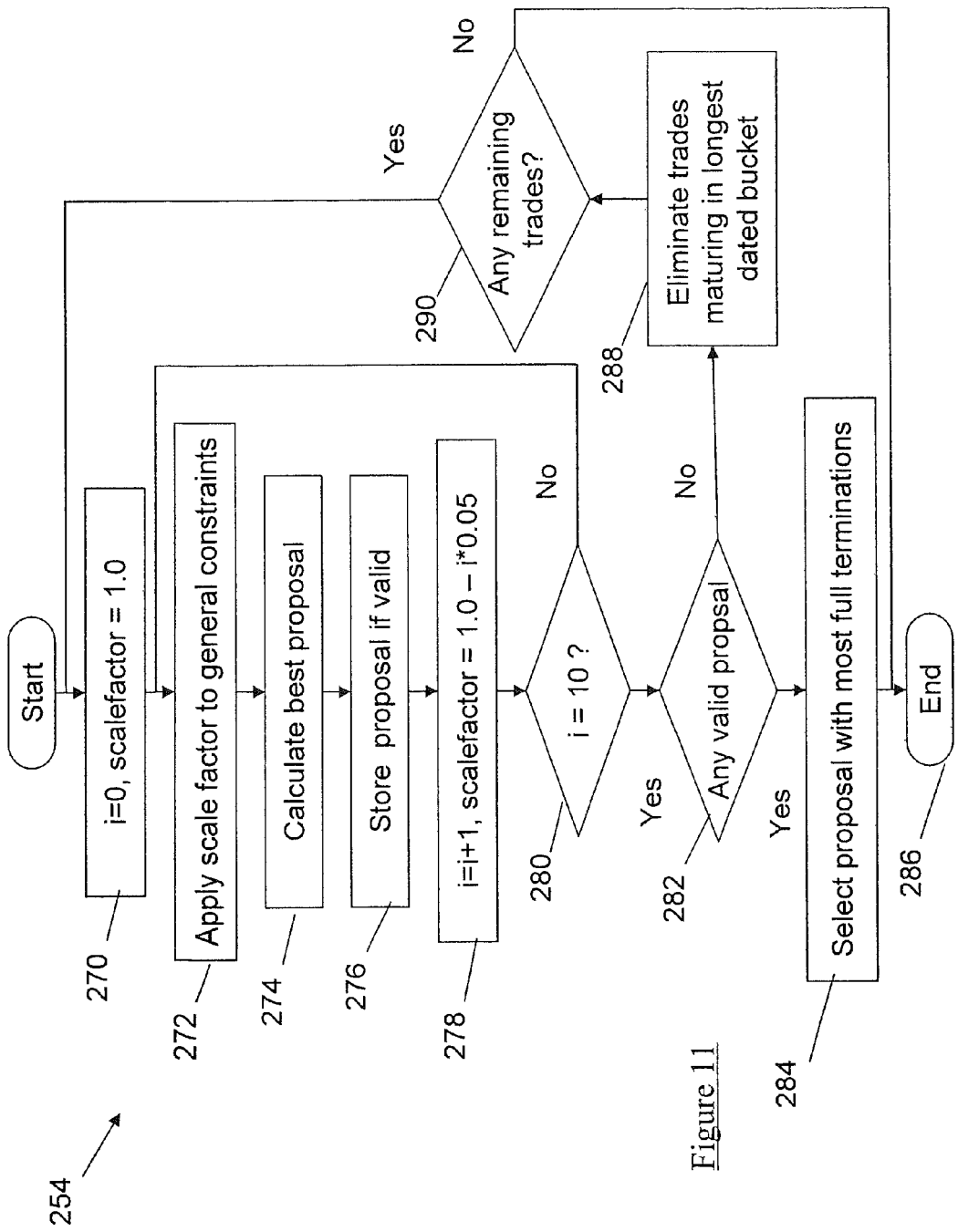
FIG. 11 is flow diagram showing the step of relaxing the general constraints of the unwind proposal calculation shown in FIG. 10.

Starting from the solution of the LP problem above, a new reformulated LP problem can be defined as is described in Steps 256, 258 and 260 of the Unwind Proposal Calculation process 250 of FIG. 10. In this reformulated LP problem, only the partially terminated trades are considered as variables. In the reformulated problem, the optimisation problem consists of either lowering at Step 256 as many partials back to zero as possible ("push down") or increasing at Step 258 as many partials up to 1.0 as possible ("push up"). When pushed down to 0.0 or increased to 1.0 they are no longer partial terminations. The reformulated problem can be performed iteratively by checking at Step 260 whether any partials remain and if so repeating the push down and push up steps 256, 258. Accordingly, in each step there is alternation between the push down and the push up optimisation problem and each step only uses the remaining partially terminated trades from the step before as variables.

More specifically, each iteration of Steps 256 and 258 comprises the following steps:

A new variable yk is defined for all variables xk that where partial, i.e. 0<xk<1.0. In the push down case, variable xk is substituted with xk(1−yk). In the push up case variable xk is substituted with xk+yk(1−xk).

As can be seen, a value of yk=0.0 leaves all xk unchanged. A value of yk=1.0 brings xk to 0.0 in the push down case and xk to 1.0 in the push up case. In both cases, xk no longer represents a partially terminated trade.

The reformulated problem consists of maximising:

$$\text{maximize } c^T y$$

subject to $$0 \leq y \leq 1.0$$

$$B'y \leq u',$$

Where c and y are np element vectors and np is the number of partials. The optimisation function (the vector c) can still have all elements set to 1.0. The constraints $0 \leq y \leq 1.0$ ensure that x also fulfills the tolerances $0 \leq x \leq 1.0$. The matrix B' only contains the rows where the partially terminated trades had non-zero elements and the elements of the matrix are found by the following derivation:

Push Down $$\sum_{i=1}^{n} Bij * xi \leq uj \Rightarrow \sum_{partials} Bij * xi + \sum_{nonpartials} Bij * xi \leq uj$$

{Substituting xi−>xi(1−yi) where xi is partial}=>

$$\sum_{i=1}^{np} Bij * xi(1-yi) + \sum_{nonpartials} Bij * xi \leq uj \Rightarrow \sum_{i=1}^{np} -Bij * yi \leq uj - \sum_{i=1}^{n} Bij * xi$$

So the new element in B' and u' becomes $$B'ij = -Bij$$

$$u'j = uj - \sum_{i=1}^{n} Bij * xi$$

Push Up $$\sum_{i=1}^{n} Bij * xi \leq uj \Rightarrow \sum_{partials} Bij * xi + \sum_{nonpartials} Bij * xi \leq uj$$

{Substituting xi−>xi+yi(1−xi) where xi is partial}=>

$$\sum_{i=1}^{np} Bij * (xi + yi(1 - xi)) + \sum_{nonpartials} Bij * xi \leq uj \Rightarrow$$

$$\sum_{i=1}^{np} Bij * yi(1 - xi) \leq uj - \sum_{i=1}^{n} Bij * xi$$

So the new element in B' and u' becomes:

$$B'ij = Bij(1 - xi)$$

$$u'j = uj - \sum_{i=1}^{n} Bij * xi$$

When the solution y to the reformulated push up/push down problem has been found, the values for y are back substituted for x by:

Push Down: $x_{inew} = x_{iold}(1-yi)$

Push Up: $x_{inew} = x_{iold} + yi(1-x_{iold})$

Whenever the solution for yi is 1.0, the value for $x_{inew}$ will be 0.0 in the push down case and 1.0 in the push up case. If so, the number of partials has been reduced and a new iteration can be made.

At Step 260, if no partials have been eliminated during two consecutive push up/push down iterations the iteration procedure stops at Step 262.

The alternating push up/push down procedure is very efficient in reducing the number of partials. The efficiency can be further improved by tightening the general constraints in the original problem as is carried out by Step 254 (mentioned above) and shown in FIG. 11. This is done by scaling the general constraints with a factor smaller than 1.0. This scaling is removed in the partial reduction algorithm. This leaves some slack in the constraints which makes it easier for the partial reduction algorithm to transform partials to fully terminated or fully kept trades.

The process commences by setting a scale factor of 0 and an index value of 1 at Step 270. The scale factor is applied to the general constraints at Step 272 and the best proposal is calculated at Step 274. If the proposal is a valid one, it is stored at Step 276. Subsequently, the index is incremented and the scalefactor reduced to 1.0 minus 5% of the index at Step 278. If the index number has not exceeded 10 (checked at Step 280) the new scalefactor is used and Steps 272 to 278 are repeated. This has the effect of trying out several different scaling factors and for each scaling factor, the ratio of full unwinds to partial unwinds is calculated. Then a check is made to determine whether any valid proposals exist at Step 282. If there is more than one scaling factor that fulfills the partial unwind tolerance ratios, then at Step 284, the scaling factor giving the largest number of fully terminated trades is selected for use in the final solution and the general constraints relaxing Step 254 ends at Step 286.

If no scaling factor gives a solution that fulfills the partial tolerances as determined at Step 282, the number of constraints must be reduced. This is achieved by eliminating trades from the original problem at Step 288 that contribute to constraints that are hard to fulfill without partial terminations. Typically, this will be trades with a long time to maturity and therefore having delta values in long-dated buckets. The number of trades that mature in each bucket generally becomes smaller the further in the future the bucket is. This means that it can be hard to fulfill the delta tolerances for long-dated buckets with a sufficient ratio of partials to full unwinds. Eliminating such trades from the original LP problem at Step 288 means that these trades will not be considered for unwinding, i.e. they will be kept on the books. After the elimination step, if there are any more trades remaining (as determined at Step 290), the process of relaxing the general constraints is repeated as can been seen in FIG. 11. Otherwise, the process ends at Step 286. The elimination of trades continues until a solution that fulfills all tolerances including the partial tolerance is found or until all trades have been eliminated in which case there exists no non-trivial solution to the unwind calculation problem. Such non-existence of a solution only occurs when there are a small number of trades and tight tolerances.

Termination Confirmation

Since all parties to an unwind proposal need to accept the proposal in order for it to be valid, a multilateral confirmation procedure is required. The confirmation procedure in the OTC derivatives market is normally divided in two phases; one acceptance phase and one written confirmation phase. The deal is binding after the acceptance; the written confirmation phase is for the record of the transaction only.

There are several ways of arranging an acceptance:
1. multilateral telephone conference
2. an agent collecting each bank's acceptance and when all are collected the agent notifies all parties that the proposal is confirmed Telephone Conference The telephone conference is arranged by sending out contact details like phone number and scheduled time together with the unwind proposal. At the scheduled time all parties to the proposals should call into the phone conference. During the phone conference, all parties should state their names, the bank they are representing and that they accept the unwind proposal. The advantage with the phone conference is that it is technically simple and conforms to the standard method of dealing on the OTC derivatives market. The disadvantage is that the procedure requires all parties to participate synchronously, which will be increasing difficult the more parties there are to a proposal.

Collection of Acceptances by an Independent Agent

Acceptances can be collected by a named agent where banks should provide their acceptance within a defined deadline. If all banks have accepted by the deadline, the agent sends out an acceptance notification to the parties. The acceptances from the bank can be done in several different ways like:
  telephone call
  fax
  toggling of a button on a web site In all cases, it is required that the parties have identified themselves and the bank they are representing. In the telephone case, this is done by stating the required information, and the agent ensures that the phone call is recorded. In the fax case, the fax should be signed. In the web site case, all banks should be provided with a username and a password that must be given before the acceptance can be made.

Returning now to the issue of delta tolerances on different levels as described previously, a typical example of how a bank would configure their tolerances using this mechanism is now described with reference to FIG. 12.

In this example, the bank has chosen to calculate delta separated on 24 time buckets, as can be seen in the leftmost column of the table ("2 DAY, 1 MONTH, 2 MONTH" etc). For each of these user-defined time buckets, i.e. on level 4, they allow for a delta in the proposal with an absolute value of 16000 EUR. However, if the delta of the proposal had the same sign and the maximum tolerated value of either +16000 or −16000 in each bucket, then the total delta would accumulate to very large positive or negative amounts. This would be an unacceptable result for the bank.

If the delta aggregated on level 3, i.e. in the buckets between 0 to 2 years, 2 to 5 years, 5 to 10 years and 10+ years had the same sign and the maximum value, the proposal would have an unacceptable delta profile for the bank. To avoid such aggregation effects, the bank sets a tolerance so that the sum of the delta in the buckets for the time ranges given above is less than the tolerance. In this example, this tolerance is +/−8000 on level 3. As can be seen, the values in the 3 year, 4 year and 5 year buckets are (−8532, 16000, −15468) respectively, which sums up to −8000. In this way, the aggregated delta for the 2 to 5 year period is then contained by the +/−8000 tolerance and this delta is lower than the delta for the individual buckets.

The same applies for the other time ranges on level 3, as well as for the time ranges on level 2 and level 1.

To have tolerances set on these different levels means that a bank can allow for wider tolerances on the lower (more granular) levels. If it had not been for the different levels, then a bank with a total delta tolerance of 2000 EUR had been forced to set a time bucket tolerances of 2000/24=83 which is far below the now set tolerance of 16000 and clearly, the higher the tolerances for each time bucket the greater the chance of the trade being able to be incorporated into an unwind proposal.

The system 20 could be arranged such that if a party enters the necessary information into the central computer 28, the system 20 will quantify the savings in terms of capital for market risk, credit risk, operational risk and future operational costs that the party can gain by following the termination proposal.

The market conditions will most likely have changed from the time when the net present values and the risk parameters were calculated until the time when the termination proposals can be executed. Still it is not likely that the market conditions have changed so dramatically that the termination proposals are invalid.

The system may be arranged to support the internal enterprise-wide risk-management-tools of party by giving them an external calibration tool.

The system can also be arranged, for each new deal that one user is about to make, to propose with which counterparties it would be favourable to execute the deal. This would be done by finding the counterparties where adding the deal will lower the net exposure on one or more of the Greeks, thereby making the sum of the transactions less prone to shifts in the valuation parameters and possibly allow for a termination proposal in the near future, or where the deal would reduce current credit exposure. This procedure can also be used in an environment where automated quote requests are sent using systems and networks, to automatically select the counterparties where the deal would be most favourable.

Having described particular preferred embodiments of the present invention, it is to be appreciated that the embodiments in question are exemplary only and that variations and modifications such as will occur to those possessed of the appropriate knowledge and skills may be made without departure from the spirit and scope of the invention as set forth in the appended claims.

The invention claimed is:

1. A system for exchanging OTC (Over the Counter) derivatives related data, the system comprising:

a plurality of data input/output and processing stations, an optional central station and a network interconnecting all stations, wherein the data input/output and processing stations are operable by parties participating in OTC derivatives related contracts for transmitting and receiving, through the network, trade details, including designated maturity dates, mark-to-market values and risk characteristics, for existing OTC derivative transactions carried out with other parties, wherein the optional central station is for receiving the trade details over the network from the data input/output and processing stations, wherein the existing OTC derivative transactions include linked OTC derivative transactions for which the trade details are available for both of the parties to the respective existing OTC derivative transaction;

wherein at least one of the data input/output and processing stations or optional central station includes a processor, wherein the processor is operable for generating, using the existing linked OTC derivative transactions, premature termination proposals consisting of packages of a plurality of linked OTC derivative transactions having designated maturity dates, wherein each of the proposals includes at least three involved parties, and wherein the proposals are for premature termination of the linked OTC derivative transactions of the packages at a date at which there is no prescribed value and no prescribed method of determining a value at which the termination of the linked OTC derivative transactions of the packages should take place, and at which there is no obligation for the involved parties to make premature terminations of the linked OTC derivative transactions of the packages, wherein there is substantially no financial loss to all of the involved parties to terminate prematurely before their respective designated maturity dates, according to parameters set by the involved parties;

wherein the at least one station provides the premature termination proposal packages to the involved parties for their approval;

wherein the processor is operable, for each new OTC derivative transaction that one party is about to make, to use the available OTC transaction data regarding the one party to propose a list of counterparties with which there is no substantial financial loss to execute the new OTC derivative transaction, wherein the list is determined by finding counterparties to the one party where adding the new OTC derivative transaction will lower net exposure to one or more of the risk characteristics, thereby making the sum of the OTC derivative transactions of the one party less dependent on changes in valuation parameters and allowing for a premature termination proposal, or where the new OTC derivative transaction reduces current credit exposure of the one party.

2. A system for exchanging OTC (Over the Counter) derivatives related data comprising:

a plurality of data input/output and processing stations and an optional central station connected to a network interconnecting all stations, wherein the data input/output and processing stations are operable by parties participating in OTC derivatives related contracts for transmitting and receiving, through the network, trade details for existing OTC derivative transactions carried out with other parties, wherein the optional central station is for receiving the trade details over the network from the data input/output and processing stations, wherein the existing OTC derivative transactions include linked OTC derivative transactions for which the trade details are available for both of the parties to the respective existing OTC derivative transaction;

wherein at least one of the data input/output and processing stations or optional central station includes a processor, wherein the processor is operable for generating, using the existing linked OTC derivative transactions, premature termination proposals consisting of packages of a plurality of linked OTC derivative transactions having designated maturity dates, wherein each of the proposals includes at least three involved parties, and wherein the proposals are for premature termination of the linked OTC derivative transactions of the packages at a date at which there is no prescribed value and no prescribed method of determining a value at which the termination of the linked OTC derivative transactions of the packages should take place, and at which there is no obligation for the involved parties to make premature terminations of the linked OTC derivative transactions of the packages, wherein there is substantially no financial loss to all of the involved parties to terminate prematurely before their respective designated maturity dates, according to parameters set by the involved parties;

wherein the at least one station provides the premature termination proposal packages to the involved parties for their approval.

3. The system of claim 2, wherein the trade details transmitted via the data input/output and processing stations include designated maturity dates, mark-to-market values and risk characteristics.

4. The system of claim 3, wherein the risk characteristics transmitted via the data input/output and processing stations are indicated as Greeks.

5. The system of claim 4, wherein the processor, based on tolerance-limits entered by the involved parties on at least one of net present values, maturity dates or one or more of the Greeks to identify intervals the involved parties consider to be risk-neutral, generates the packages having the linked OTC derivative transactions, that aggregated together can be considered to be risk-neutral, whereafter the involved parties may agree to prematurely terminate the linked OTC derivative transactions of the packages.

6. The system of claim 5, wherein counterparties of the involved parties can set target values for the net present values of a premature termination proposal to reduce at least one of credit exposures between said counterparties or other counterparties of the involved parties or collateral obligations or to prevent collateral obligations from occurring, whereafter the system is able, based on the set target net present value, to calculate the best premature termination proposal based on different criteria, where a minimal aggregated risk can be one criterion.

7. The system of claim 5, wherein counterparties of the involved parties can set target values for one or more of the Greeks of a premature termination proposal in such a way that existing exposures to one or more of the Greeks between the involved parties can be reduced, whereafter the system is able, based on the set target values for the Greeks, to calculate the best premature termination proposal based on different criteria, where a minimal aggregated present value can be one criterion.

8. The system of claim 5, wherein counterparties of the involved parties each enter into the system data specifying:
  which OTC derivative transactions should not be considered in generating the proposals; and
  allowability of partial premature terminations of existing OTC derivative transactions.

9. The system of claim 5, wherein the system produces legally binding trade terminations if all pre-agreed parameters are met.

10. The system of claim 4, arranged to produce a list of all OTC derivative transactions where individual or aggregated mark-to-market valuations of trades are such, that there is substantially no financial loss to both of the involved parties to terminate the OTC derivative transactions, which happens when valuations of both of the involved parties are within tolerance ranges of both of the involved parties.

11. The system of claim 3, wherein several bilateral sub-proposals are produced from a matching process between three or more of the involved parties.

12. The system of claim 11, wherein the parameters of each of the several bilateral sub-proposals including target values for the risk characteristics and tolerance limits for each of the involved parties are summed and considered for determining acceptable risk-neutral packages.

13. The system of claim 12, wherein the system selects the involved parties in such a way that the involved parties have circular claims, and designs the premature termination proposals in such a way that the claims are reduced.

14. The system of claim 3, arranged, for each new OTC derivative transaction that one party is about to make, to propose a list of counterparties with which there is no substantial financial loss to execute the new OTC derivative transaction, which is done by finding the counterparties where adding the new OTC derivative transaction will lower net exposure to one or more of the risk characteristics, thereby making the sum of the OTC derivative transactions less dependent on changes in valuation parameters and allow for a premature termination proposal, or where the new OTC derivative transaction reduces current credit exposure.

15. The system of claim 14, wherein automated quote requests are sent to other participants, using the network, and to counterparties of the involved parties selected by the system based upon preferences entered by the involved parties where there is no substantial financial loss for the new OTC derivative transaction from at least one of risk or credit exposure point of view as well as from a price at which the new OTC derivative transaction is concluded.

16. The system of claim 2, wherein the processor is operable for generating the proposals using at least one linked OTC derivative transaction created by the processor.

17. The system of claim 2, wherein several bilateral sub-proposals are produced from a matching process between three or more of the involved parties.

18. The system of claim 2, wherein the existing OTC derivative transactions include at least a first linked OTC derivative transaction, which has previously been assigned or novated from another party to one of the parties submitting the trade details with the approval of a counterparty to the first OTC transaction.

19. A computer-implemented method for exchanging OTC (Over the Counter) derivatives related data, wherein the OTC derivatives related data describe OTC derivative transactions having designated maturity dates, the method comprising:
  transmitting trade details by parties involved in OTC derivatives related contracts using at least one of a plurality of data input/output and processing stations, wherein a network interconnects the data input/output and processing stations and an optional central station, wherein the transmitting of the trade details by the parties is through the network to each other or the central station for OTC derivative transactions done with other parties, and wherein each party's transmitted trade details are for existing OTC derivative transactions carried out with other parties, wherein the existing OTC derivative transactions include linked OTC derivative transactions for which the trade details are available for both of the parties to the respective existing OTC derivative transaction;
  generating, by a processor of at least one of the data input/output and processing stations or the central station, using the existing linked OTC derivative transactions, premature termination proposals consisting of packages of a plurality of linked OTC derivative transactions involving at least three parties and having designated maturity dates, wherein the proposals are for premature termination of the linked OTC derivative transactions of the packages at a date at which there is no prescribed value and no prescribed method of determining a value at which the termination of the linked OTC derivative transactions of the packages should take place, and at which there is no obligation for the involved parties to make premature terminations of the linked OTC derivative transactions of the packages, wherein there is substantially no financial loss to all of the involved parties to terminate prematurely before their respective designated maturity dates, according to parameters set by the involved parties; and
  providing, by the at least one station, the premature termination proposal packages to the involved parties for their approval.

20. The method of claim 19, wherein the generating of the proposals includes using at least one linked OTC derivative transaction created by the processor.

21. The method of claim 19, wherein the transmitting step comprises transmitting at least a first linked OTC derivative transaction, which has previously been assigned or novated from another party to one of the parties submitting the trade details with the approval of a counterparty to the first OTC transaction.

* * * * *